United States Patent
Yamada et al.

(10) Patent No.: US 7,147,969 B2
(45) Date of Patent: Dec. 12, 2006

(54) POSITIVE ELECTRODE ACTIVE MATERIAL, NON-AQUEOUS ELECTROLYTE SECONDARY BATTERY AND METHOD FOR PRODUCING POSITIVE ELECTRODE ACTIVE MATERIAL

(75) Inventors: Atsuo Yamada, Kanagawa (JP); Guohua Li, Kanagawa (JP); Hideto Azuma, Kanagawa (JP)

(73) Assignee: Sony Corporation, Tokyo (JP)

( * ) Notice: Subject to any disclaimer, the term of this patent is extended or adjusted under 35 U.S.C. 154(b) by 167 days.

(21) Appl. No.: 10/611,622

(22) Filed: Jun. 30, 2003

(65) Prior Publication Data

US 2004/0002003 A1 Jan. 1, 2004

Related U.S. Application Data

(62) Division of application No. 09/701,903, filed on Feb. 14, 2001, now Pat. No. 6,632,566.

(30) Foreign Application Priority Data

Apr. 6, 1999 (JP) .............................. P11-099408
Sep. 28, 1999 (JP) .............................. P11-274380
Jan. 19, 2000 (JP) .............................. P2000-014131

(51) Int. Cl.
*H01M 4/36* (2006.01)

(52) U.S. Cl. .............. 429/221; 429/231.95; 429/218.1; 252/182.1; 252/518.1

(58) Field of Classification Search ............. 429/218.1, 429/223, 221, 224, 231.5, 231.95; 252/182.1, 252/518.1
See application file for complete search history.

(56) References Cited

U.S. PATENT DOCUMENTS

| | | | | |
|---|---|---|---|---|
| 5,910,382 A | * | 6/1999 | Goodenough et al. | ...... 429/221 |
| 6,165,642 A | | 12/2000 | Kawakami et al. | |
| 6,528,033 B1 | * | 3/2003 | Barker et al. | ................ 423/306 |
| 6,632,566 B1 | | 10/2003 | Yamada et al. | |
| 6,645,452 B1 | * | 11/2003 | Barker et al. | ................ 423/306 |

FOREIGN PATENT DOCUMENTS

JP 9-171827 6/1997

OTHER PUBLICATIONS

Padhi et al., "Phospho-Olivines as Positive-Electrode Materials for Rechargeable Lithium Batteries," J. Electrochemical Society, 1997, pp. 1188-1194, vol. 144.

* cited by examiner

*Primary Examiner*—Laura Weiner
(74) *Attorney, Agent, or Firm*—Sonnenschein Nath & Rosenthal LLP

(57) ABSTRACT

A non-aqueous electrolyte secondary battery employing a positive electrode active material containing a compound represented by the general formula $Li_xM_yPO_4$, where $0<x\leq2$ and $0.8\leq y\leq1.2$, with M containing a 3d transition metal, where $Li_xM_yPO_4$ encompasses that with the grain size not larger than 10 μm. The non-aqueous electrolyte secondary battery has superior cyclic characteristics and a high capacity.

3 Claims, 27 Drawing Sheets

POSITIVE ELECTRODE ACTIVE MATERIAL, NON-AQUEOUS ELECTROLYTE SECONDARY BATTERY AND METHOD FOR PRODUCING POSITIVE ELECTRODE ACTIVE MATERIAL

The present application is a divisional of U.S. patent application Ser. No. 09/701,903 filed Feb. 14, 2001 now U.S. Pat No. 6,632,566.

TECHNICAL FIELD

This invention relates to a method for producing a positive electrode active material that is capable of reversibly doping/undoping lithium, and a method for producing a non-aqueous electrolyte secondary battery employing this positive electrode active material.

BACKGROUND ART

Recently, with the marked progress in a variety of electronic equipment, researches in a rechargeable secondary battery, as a battery that can be used conveniently and economically for prolonged time, are underway. Typical of the known secondary batteries are a lead battery, an alkali storage battery and a lithium secondary battery.

Of these secondary batteries, a lithium secondary battery has advantages in high output and in high energy density. The lithium secondary battery is made up at least of positive and negative electrodes, containing active materials capable of reversibly introducing and removing lithium ions, and a non-aqueous electrolyte.

Nowadays, a compound having an olivinic structure, such as, for example, a compound represented by a general formula $Li_xM_yPO_4$, where x is such that $0<x\leq2$ and y is such that $0.8\leq y\leq1.2$, with M containing a 3d transition metal, is retained to be promising as a positive electrode active material for a lithium secondary battery.

It has been proposed in Japanese Laying-Open Patent H-9-171827 to use e.g., $LiFePO_4$, among the compounds represented by $Li_xM_yPO_4$, as a positive electrode for a lithium ion battery.

$LiFePO_4$ has a theoretical capacity as high as 170 mAh/g and, in an initial state, contains electro-chemically dopable Li per Fe atom, so that it is a material promising as a positive electrode active material for a lithium ion battery.

Up to now, $LiFePO_4$ was synthesized using a salt of bivalent iron, such as iron acetate $Fe(CH_3COO)_2$, as a source of Fe as a starting material for synthesis, and on sintering the starting material at a higher temperature of 800° C. under a reducing atmosphere.

However, it is reported in the above publication that, in the battery prepared using $LiFePO_4$, prepared by the above method for synthesis, as the positive electrode active material, the real capacity only on the order of 60 mAh/g to 70 mAh/g may be realized. Although the real capacity of the order of 120 mAh/g has been reported in Journal of the Electrochemical Society, 144, 1188 (1997), this real capacity cannot be said to be sufficient in consideration that the theoretical capacity is 170 mAh/g.

If $LiFePO_4$ is compared to $LiMn_2O_4$, $LiFePO_4$ has a volumetric density and an average voltage of 3.6 g/cm2 and 3.4 V, respectively, whereas $LiMnPO_4$ has a volumetric density and an average voltage of 4.2 g/cm$^2$ and 3.9 V, respectively, with its capacity being 120 mAh/g. So, $LiFePO_4$ is smaller by approximately 10% in both the voltage and the volumetric density than $LiMn_2O_4$. So, with the same capacity if 120 mAh/g, $LiFePO_4$ is smaller than $LiMn_2O_4$ by not less than 10% in weight energy density and by not less than 20% in volumetric energy density. Thus, for realizing an equivalent or higher level in $LiFePO_4$ with respect to $LiMn_2PO_4$, a capacity equal to or higher than 140 mAh/g, is required, however, such a high capacity has not been achieved with $LiFePO_4$.

On the other hand, with $LiFePO_4$, synthesized on sintering at a higher temperature of 800° C., there are occasions where crystallization proceeds excessively to retard lithium diffusion. So, with the non-aqueous electrolyte secondary battery, sufficiently high capacity has not been achieved. Moreover, if the sintering temperature is high, the energy consumption is correspondingly increased, while a higher load is imposed on e.g., a reaction apparatus.

DISCLOSURE OF THE INVENTION

It is an object of the present invention to provide a positive electrode active material which realizes a high capacity if used in a battery, and a non-aqueous electrolyte secondary battery employing the positive electrode active material.

For accomplishing the above object, the present invention provides a positive electrode active material containing a compound represented by the general formula $Li_xM_yPO_4$, where $0<x\leq2$ and $0.8\leq y\leq1.2$, with M containing a 3d transition metal, where the $Li_xM_yPO_4$ encompasses that with the grain size not larger than 10 μm.

The positive electrode active material according to the present invention contains $Li_xM_yPO_4$ with the grain size not larger than 10 μm. In this manner, the positive electrode active material is of a grain size distribution enabling e.g., lithium, as charge carrier, to be diffused sufficiently in the grains of the positive electrode active material.

The present invention also provides a positive electrode active material containing a compound represented by the general formula $Li_x(Fe_yM_{1-y})PO_4$, where $0.9\leq x\leq1.1$ and $0<y\leq1$, with M containing a 3d transition metal, wherein, in a spectrum for the $Li_x(Fe_yM_{1-y})PO_4$ obtained by the Moessbauer spectroscopic method, A/B is less than 0.3, where A is the area strength of a spectrum obtained by the Moessbauer spectroscopic method of not less than 0.1 mm/sec and not larger than 0.7 mm/sec and B is the area strength of a spectrum obtained by the Moessbauer spectroscopic method not less than 0.8 mm/sec and not larger than 1.5 mm/sec.

With this positive electrode active material, according to the present invention, since A/B is less than 0.3, the quantity of electrochemically inert impurities is small, thus realizing a high capacity.

The present invention also provides a non-aqueous electrolyte secondary battery including a positive electrode having a positive electrode active material containing a compound represented by the general formula $Li_xM_yPO_4$, where $0<x\leq2$ and $0.8\leq y\leq1.2$, with M containing a 3d transition metal, a negative electrode having a negative electrode active material, the positive electrode active material and the negative electrode active material being capable of reversibly doping/undoping lithium, and a non-aqueous electrolyte, wherein the $Li_xM_yPO_4$ encompasses that with the grain size not larger than 10 μm.

The non-aqueous electrolyte secondary battery according to the present invention contains $Li_xM_yPO_4$, with the grain size not larger than 10 μm, as a positive electrode active material. This positive electrode active material is of such a grain size distribution that enables lithium as a charge carrier to be diffused sufficiently in the grains. Thus, the non-aqueous electrolyte secondary battery is of high capacity.

The present invention also provides a non-aqueous electrolyte secondary battery including a positive electrode having a positive electrode active material containing a compound represented by the general formula $Li_x(Fe_yM_{1-y})PO_4$, where $0.9 \leq x \leq 1.1$ and $0 < y \leq 1$, with M containing a 3d transition metal, a negative electrode having a negative electrode active material, the positive electrode active material and the negative electrode active material being capable of reversibly doping/undoping lithium, and a non-aqueous electrolyte, wherein, in a spectrum for the $Li_x(Fe_yM_{1-y})PO_4$ obtained by the Moessbauer spectroscopic method, A/B is less than 0.3, where A is the area strength of a spectrum obtained by the Moessbauer spectroscopic method not less than 0.1 mm/sec and not larger than 0.7 mm/sec and B is the area strength of a spectrum obtained by the Moessbauer spectroscopic method not less than 0.8 mm/sec and not larger than 1.5 mm/sec.

The non-aqueous electrolyte secondary battery, according to the present invention, is of the value of A/B less than 0.3, and contains the positive electrode active material with low content of electrochemically inert impurities, thus realizing a non-aqueous electrolyte secondary battery of a high capacity.

It is another object of the present invention to provide a method for producing a positive electrode active material which, if used in a battery, realizes a high battery capacity.

For accomplishing the above object, the present invention provides a method for producing a positive electrode active material including a mixing step of mixing a starting material for synthesis of a compound represented by the general formula $Li_xM_yPO_4$, where $0 < x \leq 2$ and $0.8 \leq y \leq 1.2$, with M containing a 3d transition metal, and a sintering step of sintering and reacting the precursor obtained in the mixing step, wherein, in the sintering step, the precursor is sintered at a temperature not lower than 400° C. and not higher than 700° C.

In the manufacturing method for the positive electrode active material according to the present invention, the precursor of $Li_xM_yPO_4$ is sintered in the sintering step at a temperature not lower than 400° C. and not higher than 700° C. So, the chemical reaction and crystallization proceed uniformly, without the crystallization proceeding excessively, to yield impurity-free single-phase $Li_xM_yPO_4$. Also, the powder characteristics of $Li_xM_yPO_4$ are changed dramatically due to the difference in the temperature of sintering the precursor of $Li_xM_yPO_4$.

BEST MODE FOR CARRYING OUT THE INVENTION

Figure 1:
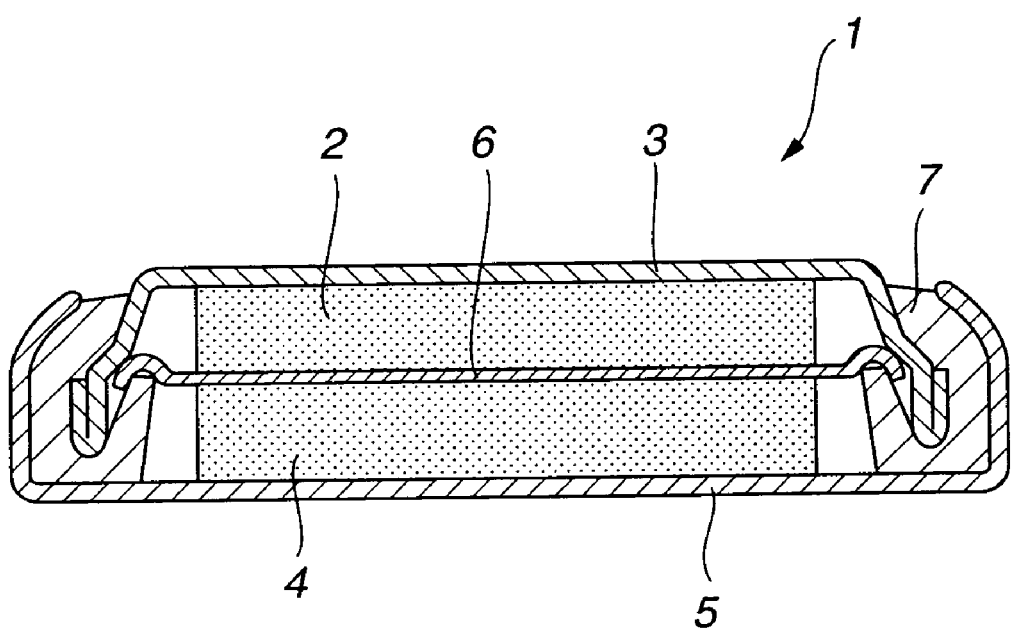
FIG. 1 is a cross-sectional view showing an illustrative structure of a non-aqueous electrolyte secondary battery embodying the present invention.

Referring to the drawings, the present invention will be explained in detail.

Referring first to FIG. 1, a non-aqueous electrolyte battery 1 according to the present invention includes a negative electrode 2, a negative electrode can 3, accommodating a negative electrode 4, a positive electrode 4, a positive electrode can 5, a separator 6 and an insulating gasket 7. The non-aqueous electrolyte is charged into the negative electrode can 3 and the positive electrode can 5.

The negative electrode 2 is comprised of a negative electrode current collector on which is deposited a layer of a negative electrode active material. A nickel foil, for example, is used as a negative electrode current collector.

As the negative electrode active materia, such a material that is capable of doping/undoping lithium, is used. For example, metal lithium, lithium alloys, an electrically conductive high polymer material doped with lithium, and a laminated compound, such as a carbon material or a metal oxide, are used.

As a binder contained in the layer of the negative electrode active material, any suitable known binders routinely used as a binder for the layer of the negative electrode active material for this sort of the non-aqueous electrolyte secondary battery may be used.

As the negative electrode 2, a metal lithium foil, operating as a negative electrode active material, may be used.

The negative electrode can 3 is used for accommodating the negative electrode 2 and also operates as an external negative electrode of the non-aqueous electrolyte battery 1.

On the positive electrode current collector of the positive electrode 4, there is formed a layer of a positive electrode active material containing a positive electrode active material.

This positive electrode active material contains a compound having an olivinic structure and which is represented by the general formula $Li_xM_yPO_4$, where x is such that $0<x\leq2$, y is such that $0.8\leq y\leq1.2$ and M contains at least one of 3d transition metals. The manufacturing method for the positive electrode active material will be explained subsequently.

The compounds represented by the general formula $Li_xM_yPO_4$ may be enumerated by, for example, $Li_xFe_yPO_4$, $Li_xMn_yPO_4$, $Li_xCo_yPO_4$, $Li_xNi_yPO_4$, $Li_xCu_yPO_4$, $Li_x(Fe, Mn)_yPO_4$, $Li_x(Fe, CO)_yPO_4$, $Li_x(Fe, Ni)_yPO_4$, $Li_x(Cu, Mn)_yPO_4$, $Li_x(Cu, CO)_yPO_4$, $Li_x(Cu, Ni)_yPO_4$, $Li_x(Mn, Ti)_yPO_4$, $Li_x(Mn, Zn)_yPO_4$ and $Li_x(Mn, Mg)_yPO_4$, where the proportions of elements in parentheses ( ) are arbitrary.

This $Li_xM_yPO_4$ includes that with the grain size not larger than 10 μm. If, as $Li_xM_yPO_4$ contained by the positive electrode active material, $Li_xM_yPO_4$, with the grain size not larger than 10 μm, is not contained, the grain size distribution is not optimum, so that lithium as a charge carrier cannot migrate sufficiently in the grain of the positive electrode active material.

The 10% cumulative volumetric diameter of $Li_xM_yPO_4$ preferably is not less than 1 μm. If the 10% cumulative volume diameter is larger than 1 μm, it may be feared that coarse grained $LiM_yPO_4$, produced due to excess progress of crystallization, accounts for the major portion of $LiM_yPO_4$, such that lithium as charge carrier cannot be diffused smoothly in the grain of the positive electrode active material.

Moreover, $Li_xM_yPO_4$ preferably has the Brunauer Emmett Teller (BET) specific surface area not lower than 0.5 $m^2/g$. With a positive electrode mixture of a larger grain size, the specific surface area becomes smaller. If the large current is allowed to flow under such conditions, that is if a large quantity of lithium ions are introduced in a short time into the active material, the diffusion of lithium in the active material cannot catch up with the lithium supply from outside, with the result that the apparent capacity is decreased. So, if desired to procure sufficient capacity under a large current, technical measures are required to increase the specific surface area, and also to reduce the grain size, as described above.

By increasing the BET specific surface area of $Li_xM_yPO_4$ to not less than 0.5 $m^2/g$, it is possible to promote lithium diffusion in the active material to secure a sufficient capacity even under a large current.

As for a compound represented by the general formula $Li_xM_yPO_4$ where M contains Fe as a 3d transition metal, that is a compound $Li_x(Fe_yM_{1-y})PO_4$, where x is such that $0.9\leq x\leq1.1$ and y is such that $0<y\leq1$, with M being a 3d transition metal, such a compound in which A/B is less than 0.3, is used, in which, in the spectrum obtained by the Moessbauer spectroscopic method, A is the area strength of the spectrum of an isomer shift value not less than 0.1 mm/sec and not larger than 0.7 mm/sec and B the area strength of the spectrum of an isomeric shift value not less than 0.8 mm/sec and not larger than 1.5 mm/sec.

For example, in $LiFePO_4$, that is $Li_x(Fe_yM_{1-y})PO_4$ where x is 1 and y is 0, Moessbauer spectroscopic measurement reveals a doublet, in which, as the Moessbauer spectrum corresponding to $Fe^{2+}$, the isomeric shift value is approximately 1.2 mm/sec and the quadrupolar fission of approximately 2.9 mm/sec. Also, if $Fe^{2+}$ is oxidized such that $Fe^{3+}$ exists in $LiFePO_4$, such a doublet in which the isomeric shift value is not less than 0.1 mm/sec and not larger than 0.7 mm/sec is observed as the Moessbauer spectrum corresponding to $Fe^{3+}$.

During initial charging process, $LiFePO_4$ is freed of Li, while $Fe^{2+}$ is oxidized to $Fe^{3+}$. If, in the pre-initial-charging state, $Fe^{2+}$ is contained in $LiFePO_4$, the number of electrons contributing to battery reaction is diminished, so that the charging capacity in the lithium ion secondary battery is lowered.

Since the lithium ion secondary battery uses an Li-free material, such as carbon, as the negative electrode, the initial charging capacity determines the subsequent battery capacity. On the other hand, if, in the lithium ion secondary battery, the Li-containing material is used as the negative electrode, but the $Fe^{3+}$-containing phase is electro-chemically inert, the battery capacity tends to be lowered due to this inert phase. Thus, in the pre-initial-charging state, $Fe^{3+}$ present in $LiFePO_4$ is desirably as small as possible.

The above-mentioned area strength A is proportionate to the amount of $Fe^{3+}$ present in $LiFePO_4$, whilst the area strength B is proportionate to the amount of $Fe^{3+}$ present in $LiFePO_4$. Therefore, in $LiFePO_4$ in which A/B is less than 0.3, the amount of $Fe^{3+}$ is small, such that a high capacity is achieved in the case of the non-aqueous electrolyte secondary battery containing this $LiFePO_4$ as the positive electrode active material.

The positive electrode current collector may, for example, be an aluminum foil.

As a binder contained in the positive electrode active material, any suitable known resin material, routinely used as a binder for a layer of the positive electrode active material of this sort of the non-aqueous electrolyte battery, may be used.

The positive electrode can 5 accommodates the positive electrode 4 and serves as an external positive electrode of the non-aqueous electrolyte battery 1.

The separator 6, used for separating the positive electrode 4 from the negative electrode 2, may be formed of a known material routinely used a separator of this sort of the non-aqueous electrolyte battery, and may, for example, be a high molecular film, such as a polypropylene film. From the relation between lithium ion conductivity and the energy density, the separator needs to be as thin as possible. Specifically, the separator thickness of, for example, not larger than 50 μm, is desirable.

The insulating gasket 7, built and unified into the negative electrode can 3, is used for preventing leakage of the non-aqueous electrolyte charged into the negative electrode can 3 and the positive electrode can 5.

As the non-aqueous electrolyte, a solution obtained on dissolving an-electrolyte in a non-protonic non-aqueous solvent is used.

The non-aqueous solvent may be exemplified by, for example, propylene carbonate, ethylene carbonate, butylene carbonate, vinylene carbonate, γ-butyrolactone, sulforane, 1,2-dimethoxyethane, 1,2-diethoxyethane, 2-methyltetrahydrofuran, 3-methyl 1,3-dioxorane, methyl propionate, methyl lactate, dimethyl carbonate, diethyl carbonate and dipropyl carbonate. Especially, from voltage stability, cyclic carbonates, such as propylene carbonate or vinylene carbonate, or chain carbonates, such as dimethyl carbonate, diethyl carbonate or dipropyl carbonate, are preferably used. As this non-aqueous solvent, only one type non-aqueous solvent or a mixture of two or more non-aqueous solvents may be used.

As the electrolyte, dissolved in the non-aqueous solvent, lithium salts, such as $LiPF_6$, $LiClO_4$, $LiAsF_6$, $LiBF_4$, $LiCF_3SO_3$ or $LiN(CF_3SO_2)_2$, may be used. Of these lithium salts, $LiPF_6$ or $LiBF_4$ may preferably be used.

The non-aqueous electrolyte secondary battery 1, employing the above-mentioned $Li_xM_yPO_4$ as the positive electrode active material, is manufactured, e.g., by the following method:

For preparing the negative electrode 2, a negative electrode active material and a binder are dispersed in a solvent to prepare a slurried negative electrode mixture. The so-produced negative electrode mixture is evenly coated on a current collector and dried in situ to form a layer of the negative electrode active material to complete the negative electrode 2. As the binder for the negative electrode mixture, any suitable known binder may be used. Alternatively, the negative electrode mixture may be added to with any suitable known additives. On the other hand, metal lithium, as a negative electrode active material, may be directly used as the negative electrode 2.

For preparing the positive electrode 4, $Li_xM_yPO_4$, which proves the positive electrode active material, and a binder, are dispersed in a solvent to prepare a slurried positive electrode mixture. The positive electrode mixture, thus produced, is evenly coated on the current collector and dried in situ to form a layer of the positive electrode active material to complete the positive electrode 4. As the binder of the positive electrode mixture, any suitable known binder may be used. Alternatively, known additives may be added to the positive electrode mixture.

The non-aqueous electrolyte is prepared by dissolving an electrolyte salt in a non-aqueous solvent.

The negative electrode is accommodated in the negative electrode can 3, while the positive electrode is accommodated in the positive electrode can 5. The separator 6 in the form of a polypropylene porous film is arranged between the negative electrode and the positive electrode 4. The non-aqueous electrolyte is charged into the negative electrode can 3 and the positive electrode can 5. These cans 3, 5 are caulked together and fastened to each other to complete the non-aqueous electrolyte battery 1.

Meanwhile, in the manufacturing method for a positive electrode active material according to the present invention, a compound having an olivinic structure and which is represented by the general formula $Li_xM_yPO_4$, where x is such that $0.9 \leq x \leq 1.1$ and y is such that $0 < y \leq 1$, with M containing a 3d transition metal, such as $LiFePO_4$, is synthesized by the following method:

First, as a starting material for synthesis, iron acetate $(Fe(CH_3COO)_2)$, ammonium hydrogen phosphate $(NH_4H_2PO_4)$ and lithium carbonate $(Li_2CO_3)$ were mixed together at a pre-set ratio to give a precursor. The starting materials for synthesis need to be mixed thoroughly. By mixing the starting materials for synthesis sufficiently, the starting materials are mixed evenly to render it possible to synthesize $LiFePO_4$ at a lower temperature than conventionally.

This precursor then is sintered at a pre-set temperature in an atmosphere of an inert gas, such as nitrogen, to synthesize $LiFePO_4$.

Heretofore, $LiFePO_4$ was sintered at a higher temperature of, for example, 800° C. If the sintering temperature is high, the energy consumption is correspondingly increased, whilst the load applied to the reaction apparatus is higher.

Thus, by sufficiently mixing the starting materials for synthesis to give a precursor, and by sintering the precursor in a nitrogen stream, it has become possible to synthesize $LiFePO_4$ at a temperature markedly lower than 800° C. so far used. That is, $LiFePO_4$ can now be synthesized at a temperature markedly lower than 800° C. heretofore used to provide for wider latitude of selection of the temperature with which to sinter the precursor (referred to below as sintering temperature). The present inventors have directed attention to the relation between the sintering temperature with which to sinter the precursor and the capacity of the battery employing $LiFePO_4$ as an active material to search into the optimum sintering temperature for $LiFePO_4$.

As a result of this search, the sintering temperature of $LiFePO_4$ is set to not less than 400° C. and not higher than 700° C. The sintering temperature of $LiFePO_4$ is preferably not less than 400° C. and not higher than 600° C.

If the sintering temperature of $LiFePO_4$ is lower than 400° C., there persists a phase containing e.g., trivalent iron compounds, as impurities, that is $Fe^{3+}$, such that homogeneous $LiFePO_4$ cannot be produced. If the sintering temperature of $LiFePO_4$ is higher than 700° C., crystallization proceeds excessively, such that there is a risk that it becomes difficult to suppress the precipitation of impurities.

Meanwhile, in the above-described manufacturing method for the positive electrode active material, the precursor is preferably de-aerated, prior to its sintering, to remove air contained in the precursor.

If air is left in the precursor, $Fe^{2+}$ in iron acetate, as a bivalent iron compound, is oxidized by oxygen in air and turned into $Fe^{3+}$ during sintering of $LiFePO_4$. The result is that the trivalent iron compound, as an impurity, is mixed into the Product $LiFePO_4$. By removing air contained in the precursor by de-aerating processing, it is possible to prevent oxidation of $Fe^{2+}$ in iron acetate. The result is that no trivalent iron compound is mixed into the produce $LiFePO_4$ to render it possible to prepare single-phase $LiFePO_4$.

As the starting materials for synthesis of $LiFePO_4$, a variety of starting materials, such as lithium hydroxide, lithium nitrate, lithium acetate, lithium phosphate, iron phosphate (II) or iron oxide (II), may be used in addition to the above-mentioned compounds. For sintering at higher temperatures of not lower than 400° C. and not higher than 700° C., it is desirable to use a starting materials of higher reactivity.

The non-aqueous electrolyte secondary battery 1, prepared as described above, contains $Li_xM_yPO_4$ as the positive electrode active material.

This positive electrode active material, containing $Li_xM_yPO_4$, having the grain size not larger than 10 μm, exhibits grain size distribution optimum for sufficient diffusion of lithium as charge carrier to occur sufficiently. So, with the non-aqueous electrolyte battery 1, lithium doping/undoping occurs satisfactorily, thus realizing superior cyclic characteristics and high capacity.

Moreover, with the present positive electrode active material, containing $Li_xM_yPO_4$, having the 10% volume cumulative diameter not larger than 1 μm, is of a grain size distribution more suited for diffusion of lithium as a charge carrier to occur more smoothly. So, the non-aqueous electrolyte battery 1, in which doping/undoping of lithium occurs satisfactorily, exhibits superior cyclic characteristics and high capacity.

In the above-described manufacturing method for the positive electrode active material, the starting materials for synthesis of a compound having the general formula $Li_xM_yPO_4$, for example, $LiFePO_4$, are mixed together to form a precursor, which precursor is then sintered at a temperature not lower than 400° C. and not higher than 700° C., so that the chemical reaction and crystallization proceed evenly whilst crystallization does not proceed excessively. This gives impurity-free single-phase $LiFePO_4$ as a positive electrode active material. Thus, the positive electrode active material is able to achieve a high capacity exceeding 120 mAh/g of a conventional non-aqueous electrolyte battery.

Moreover, by setting the sintering temperature range to not lower than 400° C. and not higher than 600° C., it is possible to realize a real capacity approaching to 170 mAh/g which is the theoretical capacity of $LiFePO_4$.

It is noted that the positive electrode active material of the present invention is not limited to $LiFePO_4$ as described above, but may also be applied to any suitable compound represented by the general formula $Li_xM_yPO_4$.

Moreover, the present invention is not limited to this and may be applied to the use as the non-aqueous electrolyte of a solid electrolyte or a gelated solid electrolyte containing a swelling solvent. The present invention may also be applied to a variety of shapes of the non-aqueous electrolyte secondary batteries, such as a cylindrical shape, a square shape, a coin or a button shape, or to a variety of sizes of the non-aqueous electrolyte secondary battery, such as a thin type or large-sized batteries.

Although the foregoing description has been made of a manufacturing method for a positive electrode active material including mixing and sintering powders of compounds as starting materials for synthesis of $LiFePO_4$. The present invention is, however, not limited to this method since it may be applied to the solid-phase reaction or to a variety of reactions other than the solid phase reaction to synthesize a compound represented by the general formula $Li_xM_yPO_4$.

The present invention will hereinafter be explained with reference to specified Examples and Comparative Examples based on experimental results.

<Experiment 1>

In Experiment 1, a compound represented by the general formula $Li_xM_yPO_4$ was prepared as a positive electrode active material and non-aqueous electrolyte secondary batteries employing this positive electrode active material were prepared as test cells to evaluate various characteristics thereof.

First, in order to valuate the difference in characteristics of non-aqueous electrolyte secondary batteries caused by the difference in the grain size distribution of the positive electrode active material, positive electrode active materials were prepared using variable sintering temperatures, and test cells were prepared using these positive electrode active materials.

Sample 1

First, $LiFePO_4$ was prepared as a positive electrode active material with the sintering temperature of 600° C.

For preparing $LiFePO_4$, ammonium dihydrogen phosphate ($NH_4H_2PO_4$) as a starting materials of a coarser crystallite size was sufficiently pulverized at the outset. Then, iron acetate ($Fe(CH_3COO)_2$), ammonium dihydrogen phosphate ($NH_4H_2PO_4$) and lithium carbonate ($Li_2CO_3$) were mixed sufficiently to a molar ratio of 2:2:1 to give a precursor.

The precursor was then calcined at 300° C. for 12 hours and subsequently sintered in a nitrogen atmosphere for 24 hours to synthesize $LiFePO_4$.

A battery was prepared using $LiFePO_4$, thus prepared, as a positive electrode active material.

70 wt % of dried $LiFePO_4$, as the positive electrode active material, 25 wt % of acetylene black, as an electrically conductive material, and 5 wt % of polyvinylidene fluoride, as a binder, were evenly mixed into dimethyl formamide as a solvent to prepare a paste-like positive electrode mixture. Meanwhile, #1300 manufactured by Aldrich Inc. was used as the polyvinylidene fluoride.

This positive electrode mixture was applied to an aluminum mesh, as a current collector, and dried in situ in a dry argon atmosphere at 100° C. for one hour to form a layer of the positive electrode active material.

The aluminum mesh, on which the layer of the positive electrode active material was formed, was punched to a disc 15 mm in diameter to form a pellet-like positive electrode. Meanwhile, this positive electrode carries 60 mg of the active material.

A metal lithium foil was punched to substantially the same shape as the positive electrode and used as a negative electrode.

In a mixed solvent of equal parts in volume of propylene carbonate and dimethyl carbonate was dissolved $LiPF_6$ at a concentration of 1 mol/l to prepare a non-aqueous electrolytic solution.

The positive electrode, prepared as described above, was accommodated in the positive electrode can, whilst the negative electrode was accommodated in the negative electrode can and the separator was arranged between the positive electrode and the negative electrode. The non-aqueous electrolytic solution was charged into the positive electrode can and the negative electrode can. The electrode cans 3, 5 are caulked fixedly through the insulating gasket 7 to complete a 2025 type coin-shaped test cell.

Sample 2

$LiFePO_4$ was prepared in the same way as in Sample 1, except using the sintering temperature of 400° C., and a test cell was prepared using this positive electrode active material.

Sample 3

$LiFePO_4$ was prepared in the same way as in Sample 1, except using the sintering temperature of 500° C., and a test cell was prepared using this positive electrode active material.

Sample 4

$LiFePO_4$ was prepared in the same way as in Sample 1, except using the sintering temperature of 700° C., and a test cell was prepared using this positive electrode active material.

Sample 5

$LiFePO_4$ was prepared in the same way as in Sample 1, except using the sintering temperature of 800° C., and a test cell was prepared using this positive electrode active material.

Figure 2:
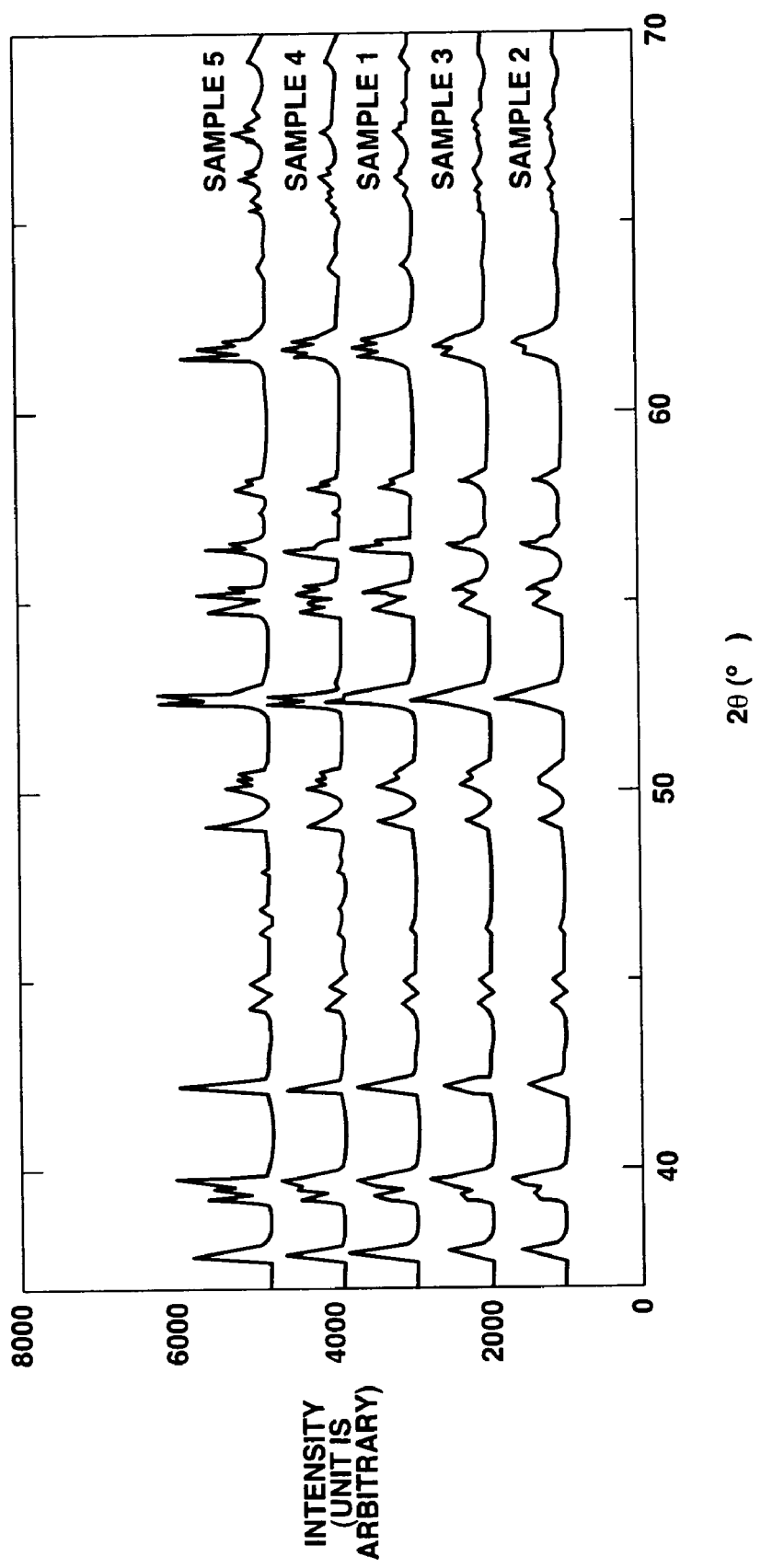
FIG. 2 is a graph showing a powder X-ray diffraction pattern of $LiFePO_4$ synthesized in samples 1 to 5.

Then, measurement was made of the powder X-ray diffraction pattern of the $LiFePO_4$, as a positive electrode active material, prepared by the above-described method. The measurement conditions of the powder X-ray diffraction were as follows:

apparatus used: RIGAKU RINT 2500 rotary counter pair negative electrode
goniometer: vertical type standard, radius 185 mm
counter monochromator: used
filter: not used
slit width
   divergent slit (DS)=1°
   receiving slit (RS)=1°
   scattering slit (SS)=0.15 mm
counter device: scintillation counter
measurement method: reflection method, continuous scan
scanning range: 2θ=10° to 80°
scanning speed: 4°/minute The powder X-ray diffraction pattern of $LiFePO_4$, synthesized in Example 1, is shown in FIG. 2, from which it is seen that a single-phase $LiFePO_4$ has been obtained since the presence of the impurity other than $LiFePO_4$ is not confirmed in the product.

The test cells, prepared as samples 1 to 4, were subjected to the charging/discharging test, in which each test cell was charged by constant current charging and, when the battery voltage reached 4.5V, the charging system was switched from the constant current charging to constant voltage charging, and charging was carried out as the voltage of 4.5 V was kept. The charging was stopped when the current fell below 0.01 $mA/cm^2$. The discharging then was carried out and stopped at a time point when the battery voltage was lowered to 2.0 V. Meanwhile, charging/discharging was carried out at ambient temperature (23° C.), with the current density at this time being 0.12 $mA/cm^2$.

Figure 3:
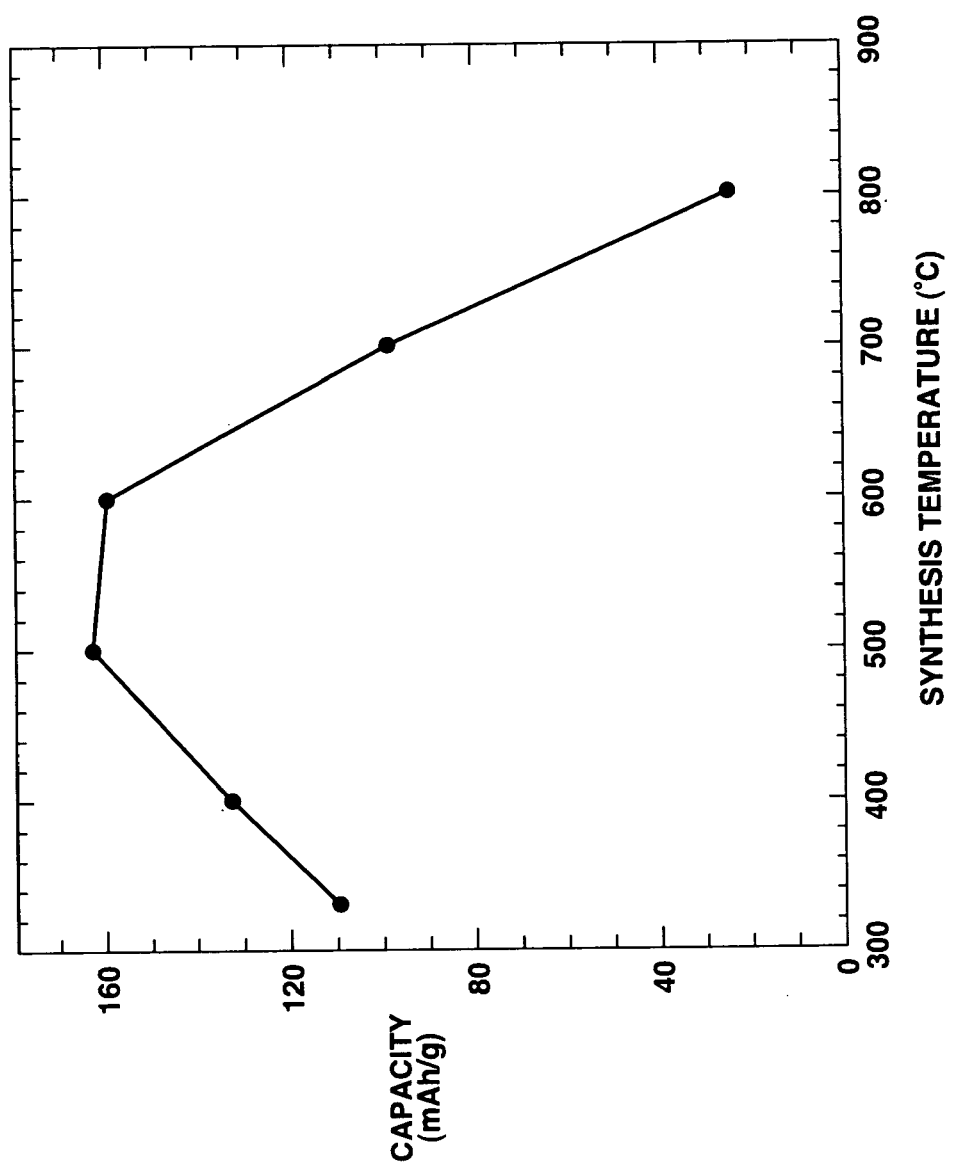
FIG. 3 is a graph showing the relation between the sintering temperature of $LiFePO_4$ synthesized in samples 1 to 5 and the charging/discharging capacity of the battery.

The relation between the sintering temperature of $LiFePO_4$, synthesized in Samples 1 to 5 and the battery charging/discharging capacity, as the result of the charging/discharging test, is shown in FIG. 3, from which it is seen that the non-aqueous electrolyte secondary battery comes to have a high capacity by sintering $LiFePO_4$ as the positive electrode active material at a temperature not lower than 400° C. and not higher than 700° C. It has also been seen that, when the sintering temperature of the precursor is not lower than 400° C. and not higher than 600° C., the non-aqueous electrolyte secondary battery comes to have an extremely high capacity.

Of the positive electrode active materials, synthesized as samples 1 to 5, measurements were made of the volumetric grain size distribution. For measuring the volumetric grain size distribution, a volume grain size distribution measurement device, manufactured by HORIBA SEISAKUSHO CO. LTD. under the trade name of Micro-Lack grain size analyzer LA-920, was used. Using this measurement device, the scattering of the laser light was measured to measure the volumetric grain size distribution. The measured results of the volumetric grain size distribution are shown in FIG. 4.

Figure 4:
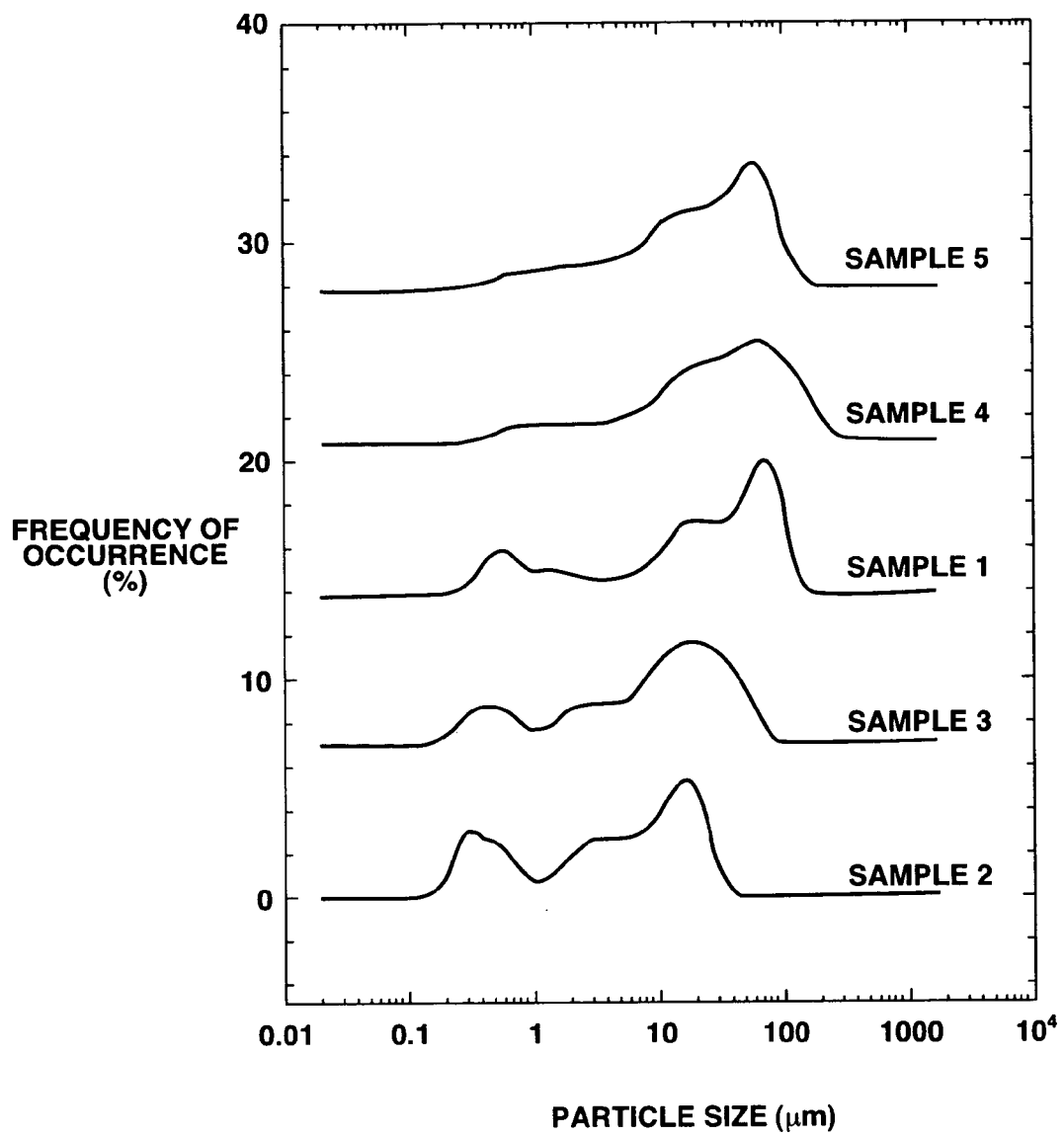
FIG. 4 is a graph showing the relation between the sintering temperature of $LiFePO_4$ synthesized in samples 1 to 5 and the volumetric grain size distribution of the battery.

As may be seen from FIG. 4, if the sintering temperature is higher than 600° C., the volumetric distribution of $LiFePO_4$ with the grain size larger than 10 μm, is increased as the center of distribution is shifted towards the coarse grain side. On the other hand, the volumetric distribution of $LiFePO_4$ with the grain size not larger than 10 μm is decreased appreciably.

If the sintering temperature is not higher than 600° C., the volumetric distribution of $LiFePO_4$, having the grain size not larger than 10 μm, is increased as the center of distribution is shifted towards the finer grain side.

From the results of the volumetric grain size, shown in FIG. 4, and from the results between the sintering temperature shown in FIG. 3 and the battery charging/discharging capacity, it has been seen that it is the $LiFePO_4$ grains not larger 10 μm that are contributing to the battery capacity.

From this it is seen that the non-aqueous electrolyte secondary battery containing $LiFePO_4$ having a grain size not larger than 10 μm as the positive electrode active material comes to have an extremely high capacity.

Figure 5:
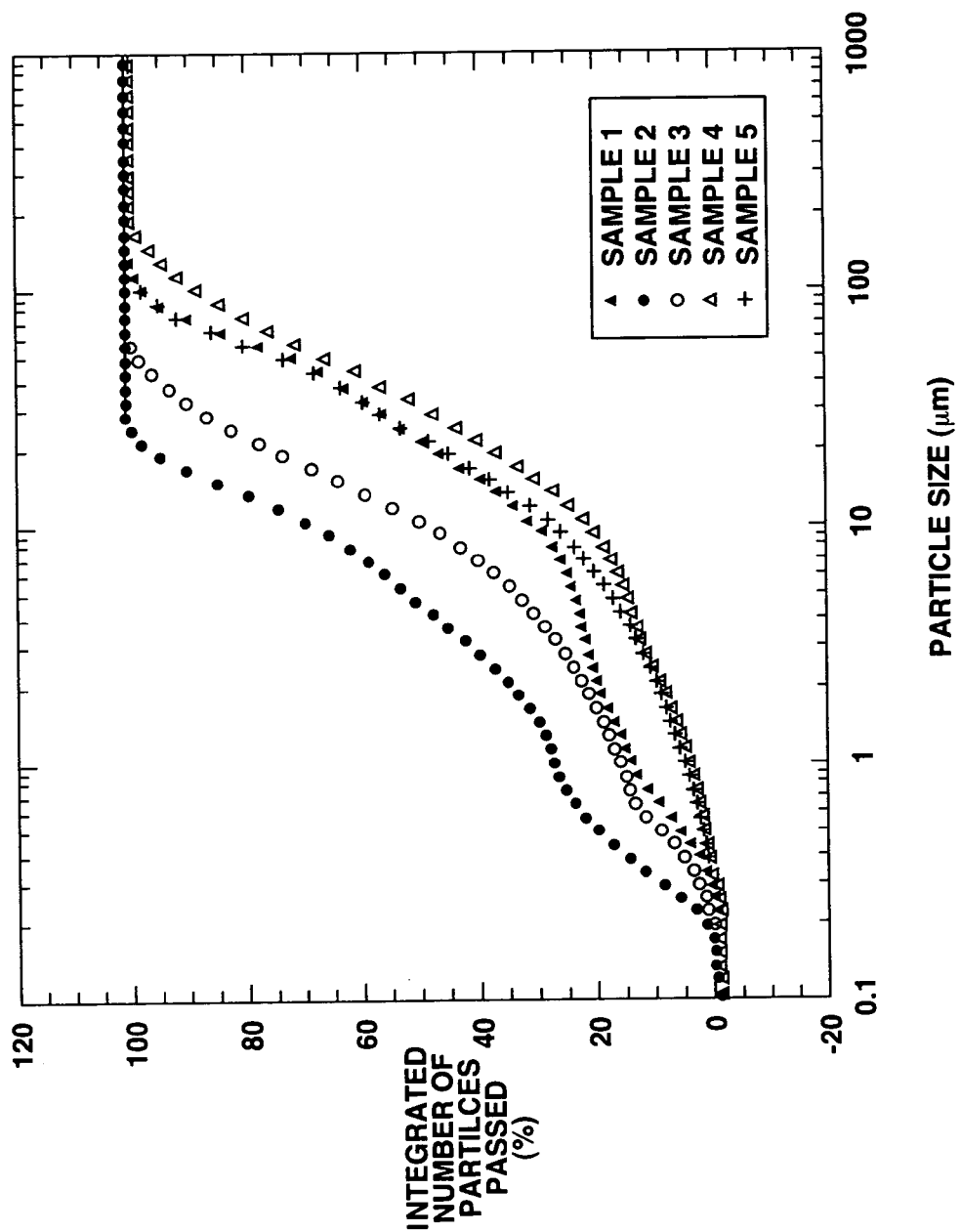
FIG. 5 is a graph showing the relation between the sintering temperature of $LiFePO_4$ synthesized in samples 1 to 5 and the volumetric grain size distribution of the battery.
Figure 6:
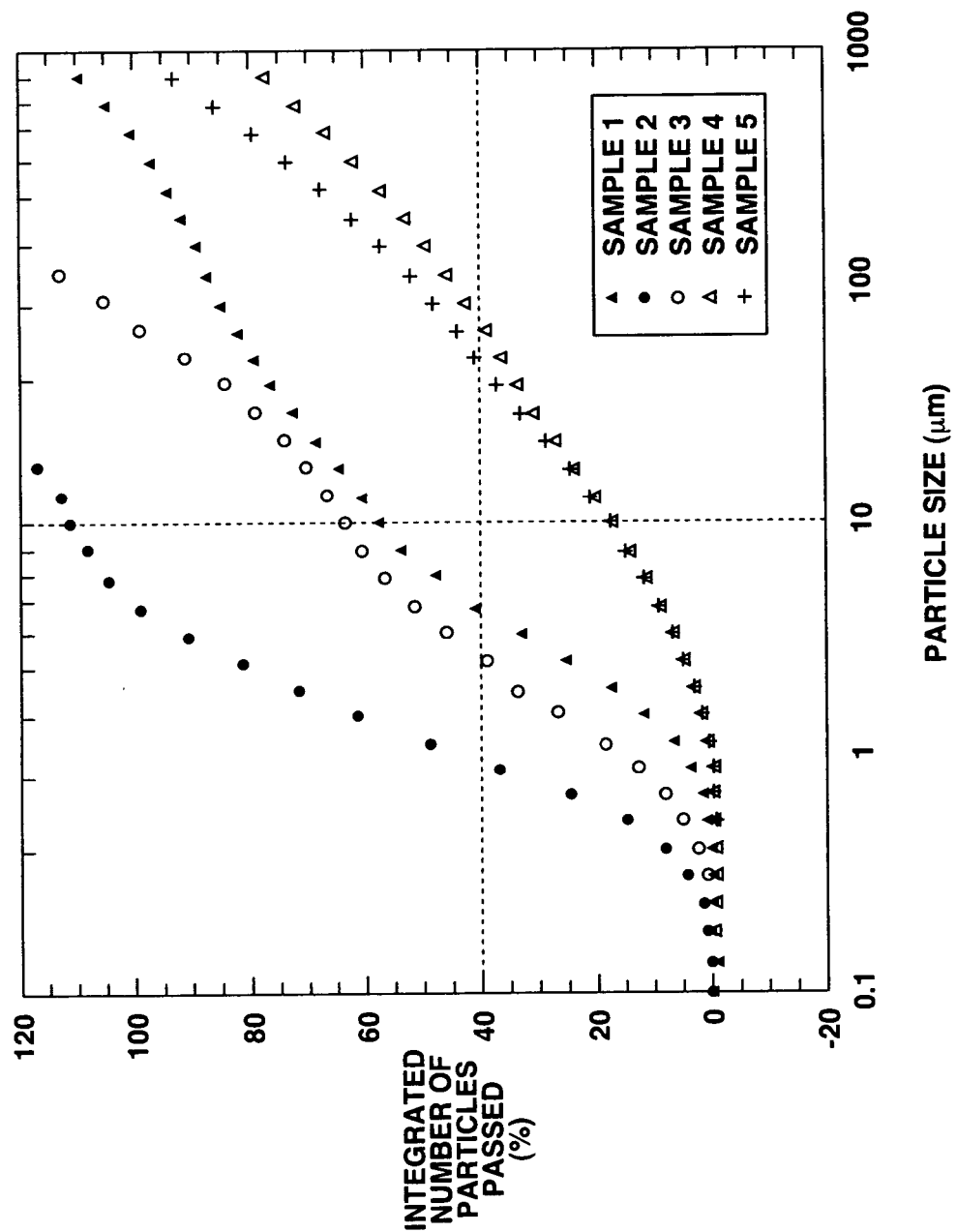
FIG. 6 is a graph showing the relation between the sintering temperature of $LiFePO_4$ synthesized in samples 1 to 5 and the volumetric cumulative diameter of the battery.

The relation between the sintering temperature and the cumulative volumetric grain size of $LiFePO_4$, as found from the measured results of the volumetric grain size distribution, is shown in FIG. 5, from which it is seen that there is a definite correlation between the grain size of $LiFePO_4$ and the sintering temperature of $LiFePO_4$. FIG. 6 shows the same relation as that shown in FIG. 5, but with the range of 0.1 to 10 μm of the grain size increased in scale.

It is seen from FIG. 6 that, if the sintering temperature of $LiFePO_4$ is not higher than 600° C., $LiFePO_4$, having a grain not larger than 1 μm, accounts for not less than 10%. On the other hand, if the sintering temperature of $LiFePO_4$ is higher than 600° C., $LiFePO_4$ with the grain size not larger than 1 μm is less than 10%.

From the results of the relation between the sintering temperature and the cumulative volumetric grain size (for the grain size ranging between 0.1 and 10 μm) of $LiFePO_4$, shown in FIG. 6, and from the results of the relation between the sintering temperature and the battery charging/discharging capacity, the non-aqueous electrolyte secondary battery preferably contains $LiFePO_4$, having the 10% volumetric cumulative grain size not larger than 1 μm, as a positive electrode active material, whereby the battery comes ro have a high real capacity approaching to the theoretical capacity of $LiFePO_4$.

Figure 7:
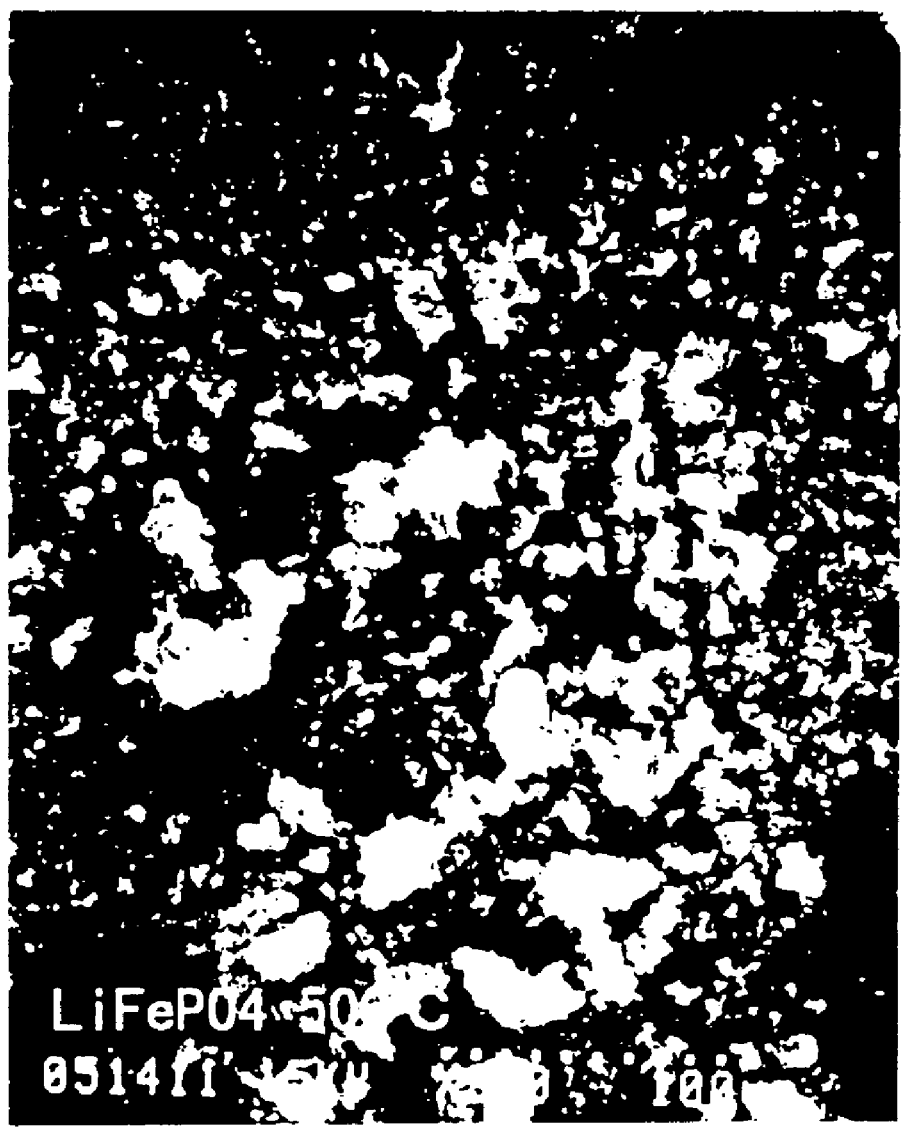
FIG. 7 is a photo, taken by a scanning microscope, for showing the grain shape of $LiFePO_4$ sintered at 500° C.
Figure 8:
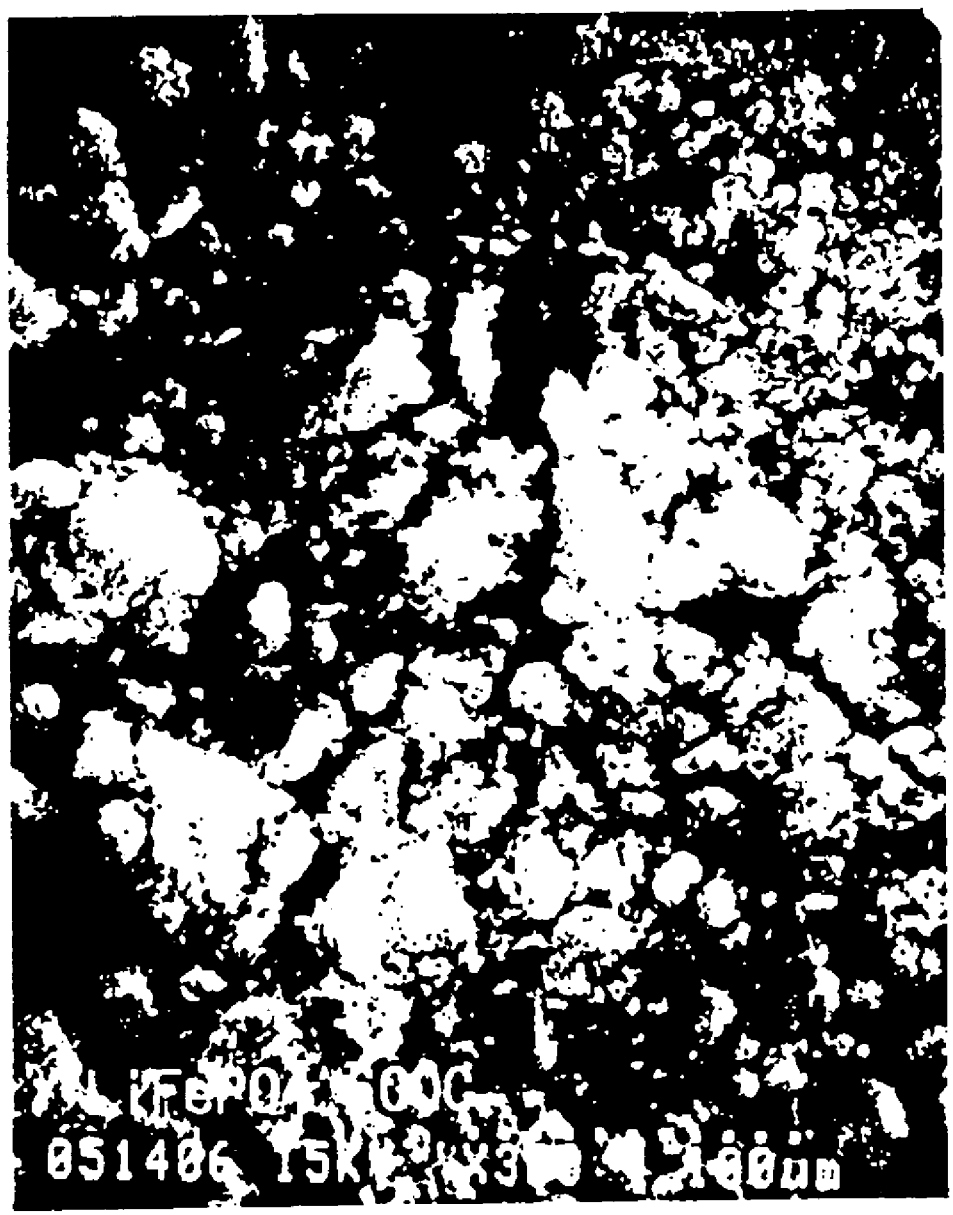
FIG. 8 is a photo, taken by a scanning microscope, for showing the grain shape of $LiFePO_4$ sintered at 600° C.
Figure 9:
FIG. 9 is a photo, taken by a scanning microscope, for showing the grain shape of $LiFePO_4$ sintered at 700° C.

The positive electrode active materials of the samples 3, 1 and 4, with the $LiFePO_4$ sintering temperatures of 500° C., 600° C. and 700° C., respectively, were observed over a scanning microscope. The respective microscopic photos are shown in FIGS. 7, 8 and 9, from which it may be clearly seen that $LiFePO_4$ undergoes specific growth with rise in the sintering temperature to prove coarse sized grains. This is in satisfactory agreement with the results of the volumetric grain size distribution shown in FIG. 5. From this it is seen that crystallization of $LiFePO_4$ proceeds with rise in the sintering temperature.

The BET specific surface area was also measured of $LiFePO_4$ synthesized in samples 1 to 5. The measured results of the BET specific surface area are shown in FIG. 10, in which there are also plotted measured results on $LiFePO_4$, in which the sintering temperature is changed more finely, in addition to those on the samples 1 to 5.

Figure 10:
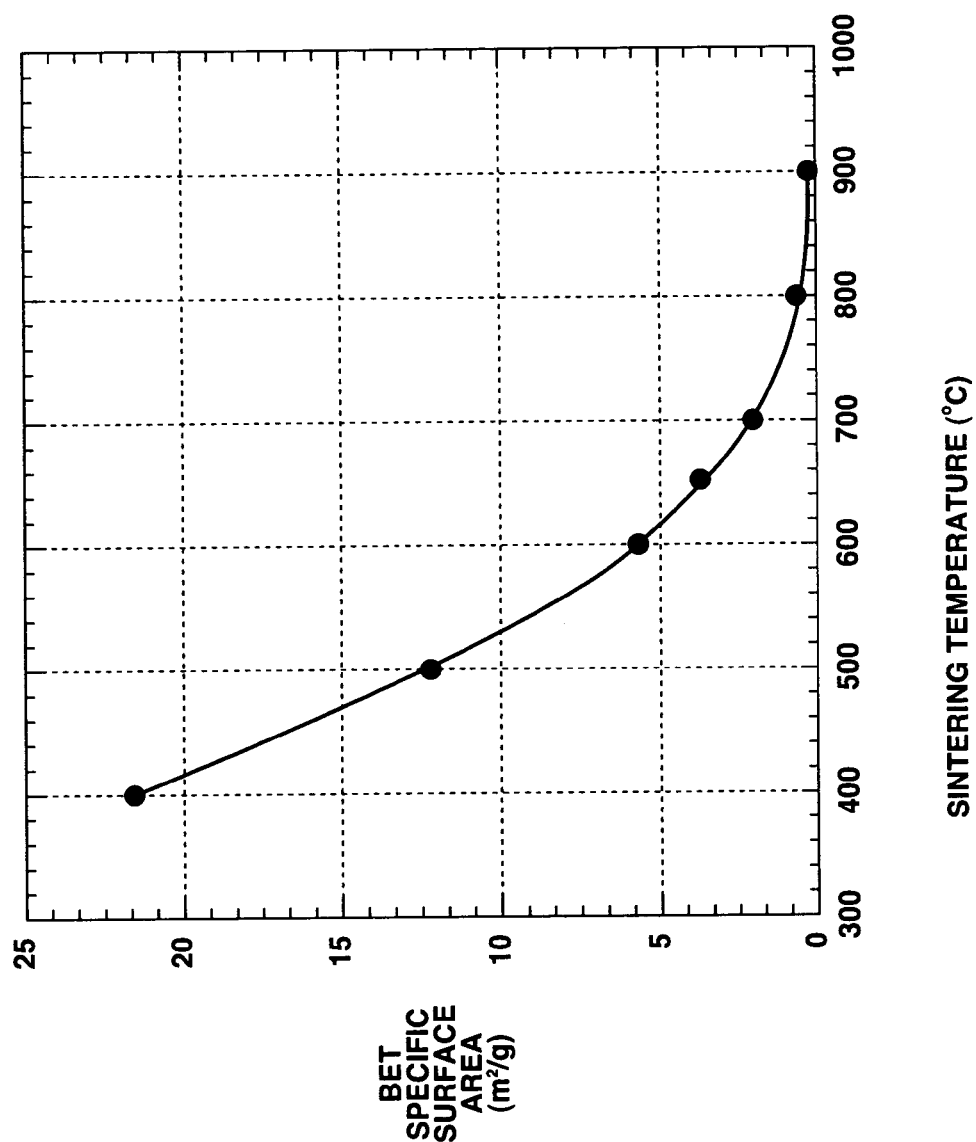
FIG. 10 is a graph showing BET specific surface area of $LiFePO_4$ synthesized in samples 1 to 5.

It is seen from FIG. 10 that the BET specific surface area is changed monotonously with rise in the sintering temperature of $LiFePO_4$, with the change width being of an extremely large value ranging from not less than 20 $m^2/g$ to 0.5 $m^2/g$.

It is seen from comparison of FIG. 10 to FIG. 3 showing the sintering temperature and the discharging capacity of $LiFePO_4$ that a real capacity almost as high as the theoretical capacity of $LiFePO_4$ is achieved when the BET specific surface area of $LiFePO_4$ as the positive electrode active material is not less than 0.5 $m^2/g$ and more preferably is not less than 2 $m^2/g$.

For scrutinizing into an optimum sintering temperature of the positive electrode active material, a positive electrode active material was synthesized at a sintering temperature lower than that used conventionally and, using the positive electrode active material, a test cell was prepared as sample 6.

Sample 6

LiFePO$_4$ was prepared in the same way as in sample 1 except using the sintering temperature of 320° C. and a test cell was prepared using the so-produced LiFePO$_4$ as a positive electrode active material.

Figure 11:
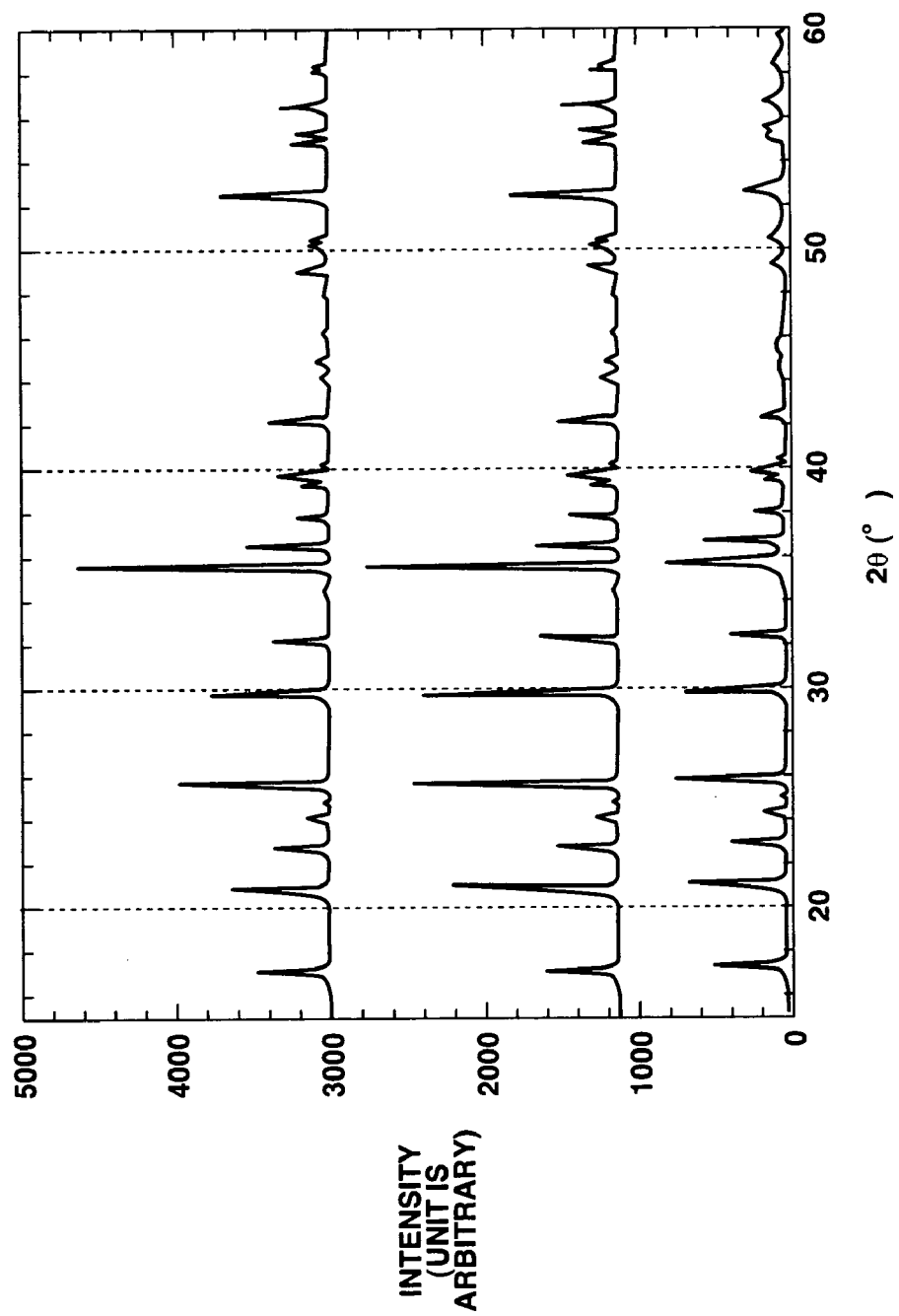
FIG. 11 is a graph showing a powder X-ray diffraction pattern of $LiFePO_4$ synthesized in samples 1, 5 and 6.

First, the powder X-ray diffraction pattern was measured of the positive electrode active material synthesized in sample 6 and positive electrode active material synthesized in samples 1 and 5, that is LiFePO$_4$. The measured results are shown in FIG. 11, from which it is seen that, in LiFePO$_4$ synthesized in samples 1, 5 and 6, no impurities other than LiFePO$_4$ are confirmed to be present in the product such that single-phase LiFePO$_4$ has been produced in each sample.

A charging/discharging test was then conducted on the test cells prepared in samples 1, 5 and 6.

Figure 12:
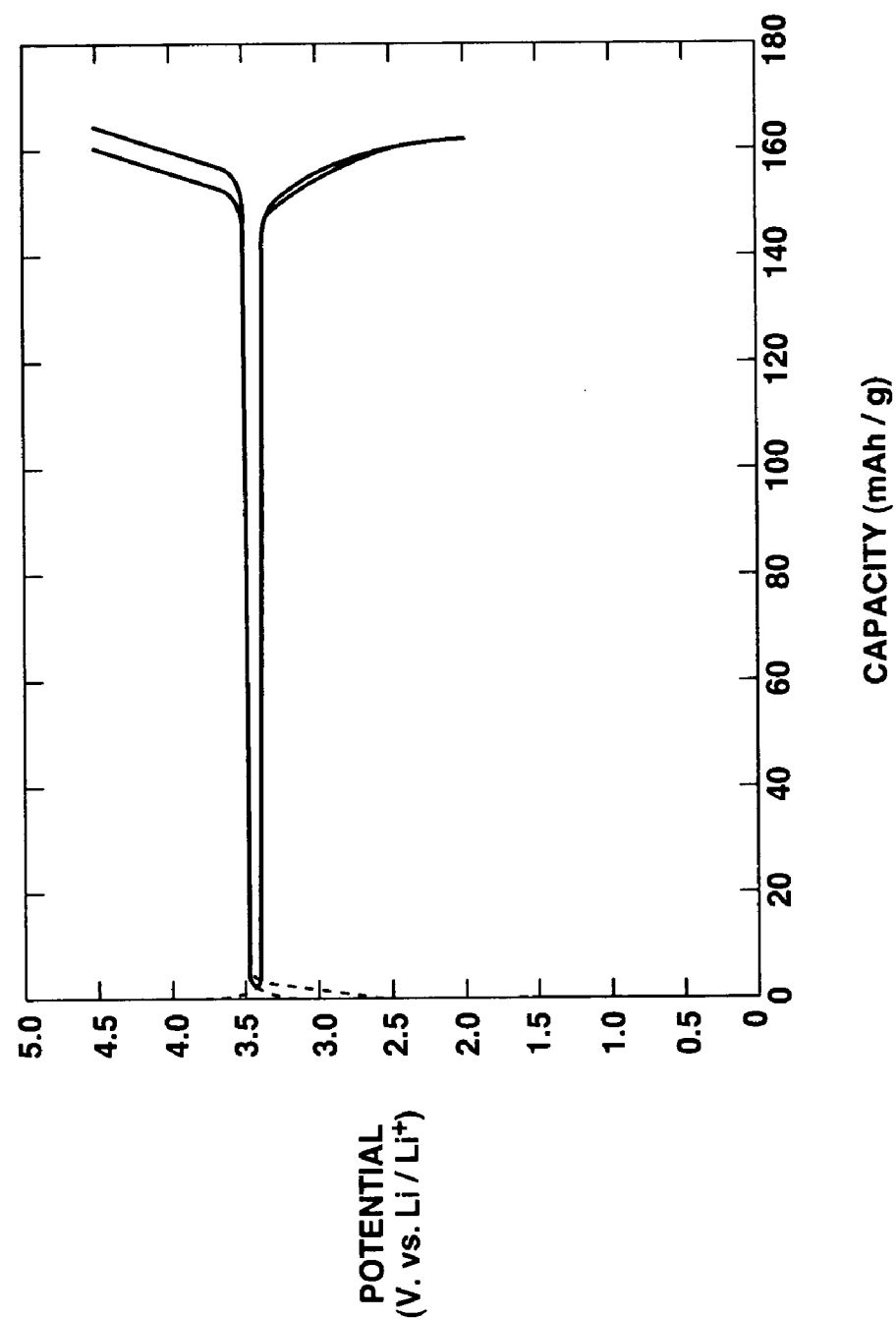
FIG. 12 is a graph showing charging/discharging characteristics of a battery prepared in sample 1.

The charging/discharging characteristics of the sample 1 are shown in FIG. 12, from which it is seen that the battery of sample 1 employing LiFePO$_4$ obtained on sintering the precursor at 600° C. as a positive electrode active material shows a flat potential in the vicinity of 3.4 V. Moreover, in this battery, a reversible charging/discharging capacity of 163 mAh/g is produced in this battery. This value of 163 mAh/g approaches 170 mAh/g which is the theoretical capacity of LiFePO$_4$.

Figure 13:
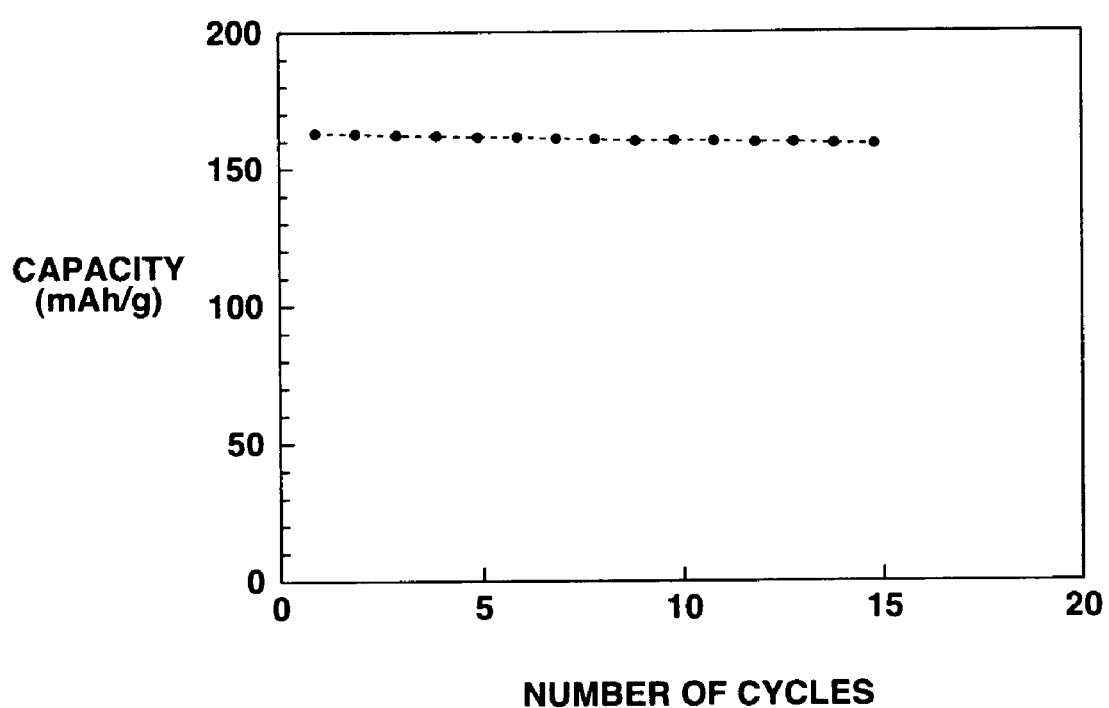
FIG. 13 is a graph showing cyclic characteristics of a battery prepared in sample 1.

The relation between the number of cycles and the charging/discharging capacity of the battery of sample 1 is shown in FIG. 13, from which it is seen that cyclic deterioration of the charging/discharging capacity is as low as 0.1%/cycle thus testifying to stable battery characteristics.

Figure 14:
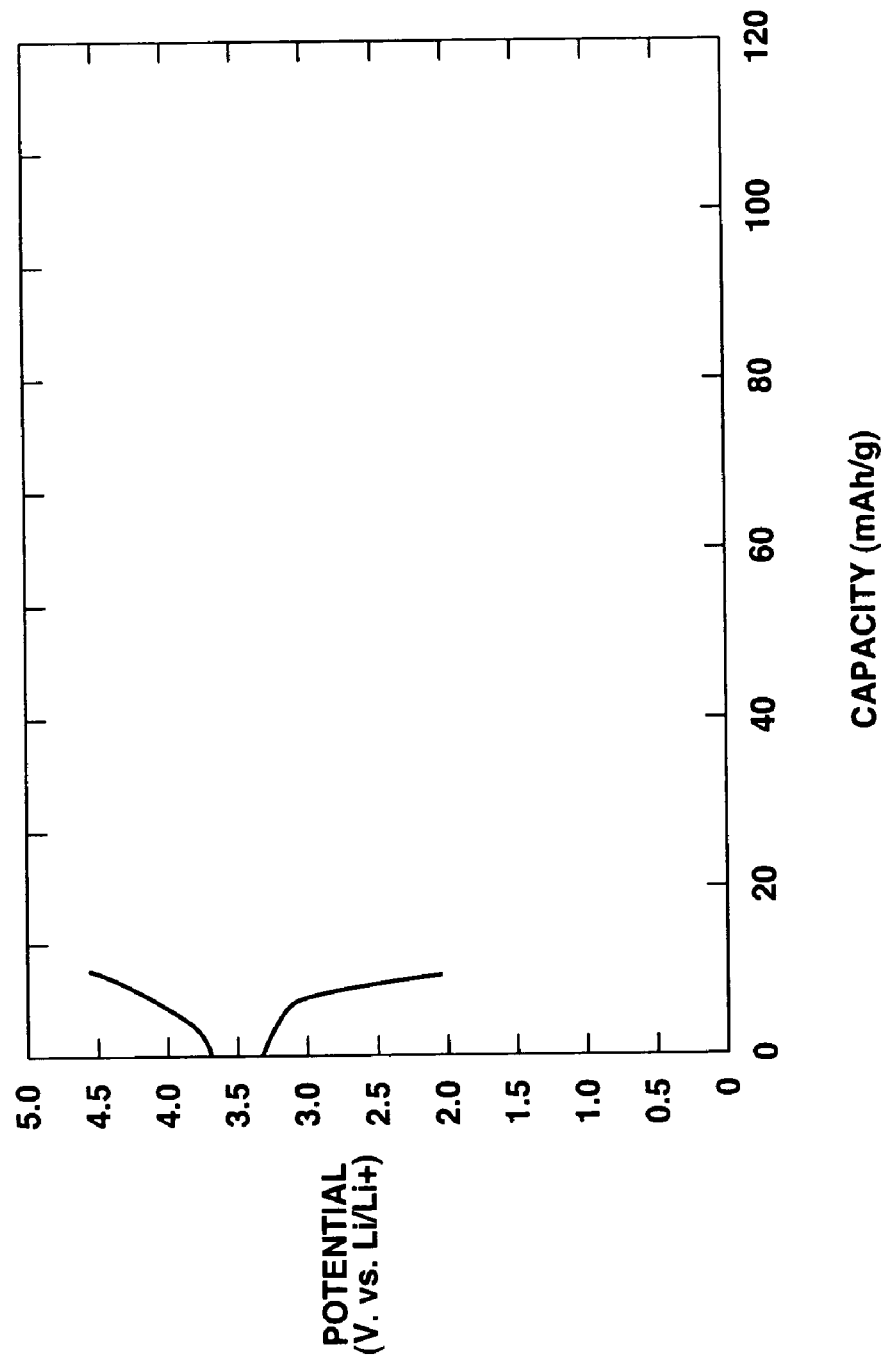
FIG. 14 is a graph showing charging/discharging characteristics of a battery prepared in sample 5.
Figure 15:
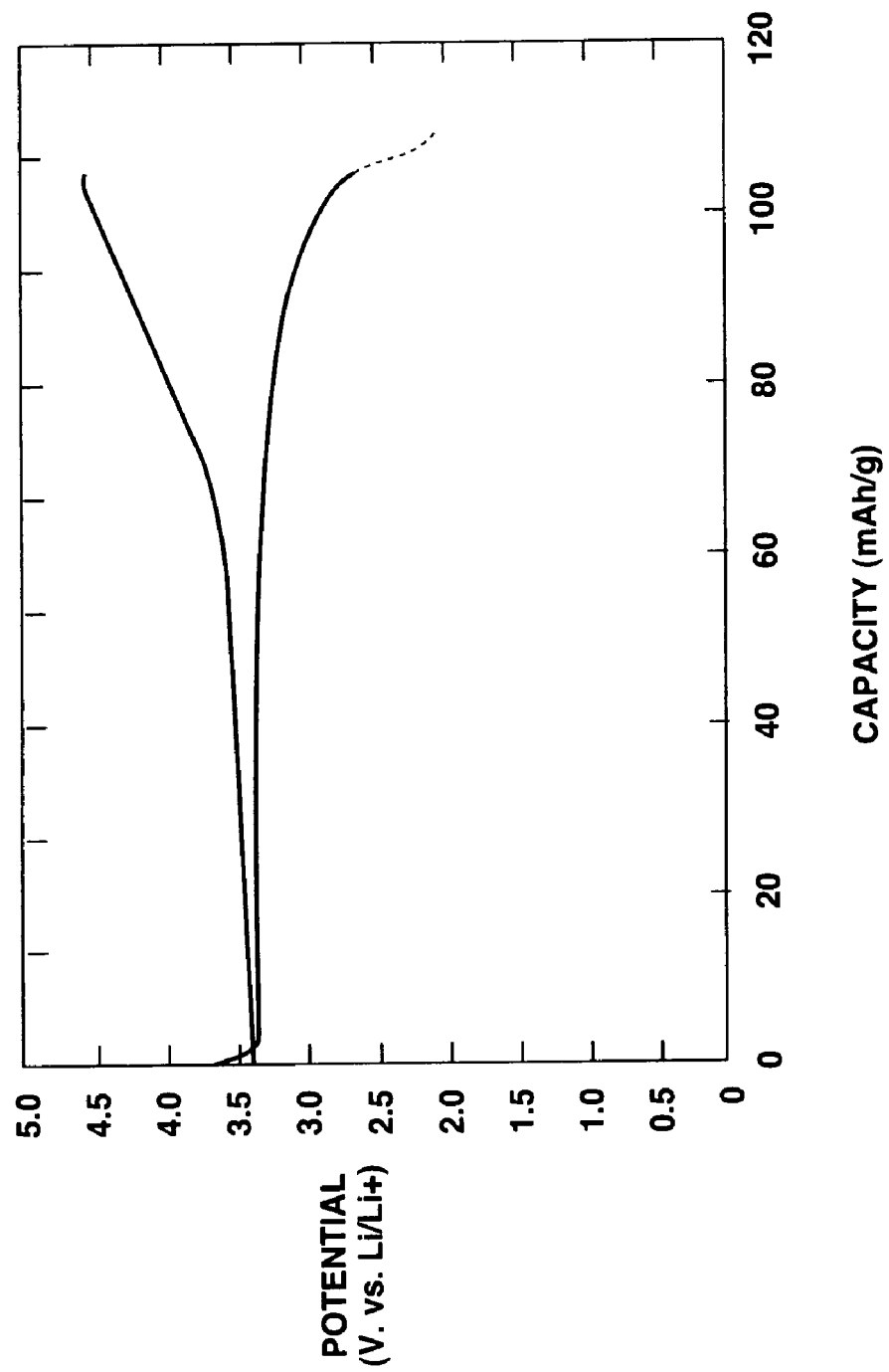
FIG. 15 is a graph showing charging/discharging characteristics of a battery prepared in sample 6.

On the other hand, FIG. 14 shows that the charging/discharging capacity of the sample 5 battery is extremely low. This is presumably ascribable to the fact that, since the sintering temperature of LiFePO$_4$ is as high as 800° C. so that crystallization proceeds excessively to prohibit sufficient lithium diffusion in the LiFePO$_4$ particles.

It is also seen that, with the battery of sample 5, the charging/discharging capacity achieved is extremely low, as shown in FIG. 14. This is probably due to the fact that the sintering temperature of LiFePO$_4$ is as high ss 800° C. such that crystallization proceeds excessively such that lithium diffusion does not occur sufficiently in the LiFePO$_4$ grains.

It is seen from the above results that a high capacity is achieved with LiFePO$_4$, as a positive electrode active material, obtained with the sintering temperature of not less than 400° C. and not higher than 700° C.

Moreover, it is seen that a high real capacity exceeding 120 mAh/g of the conventional non-aqueous electrolyte secondary battery can be achieved by adding MnCO$_3$ into the starting materials and by sintering LiFePO$_4$ at the sintering temperature of not less than 400° C. and not higher than 700° C.

Figure 16:
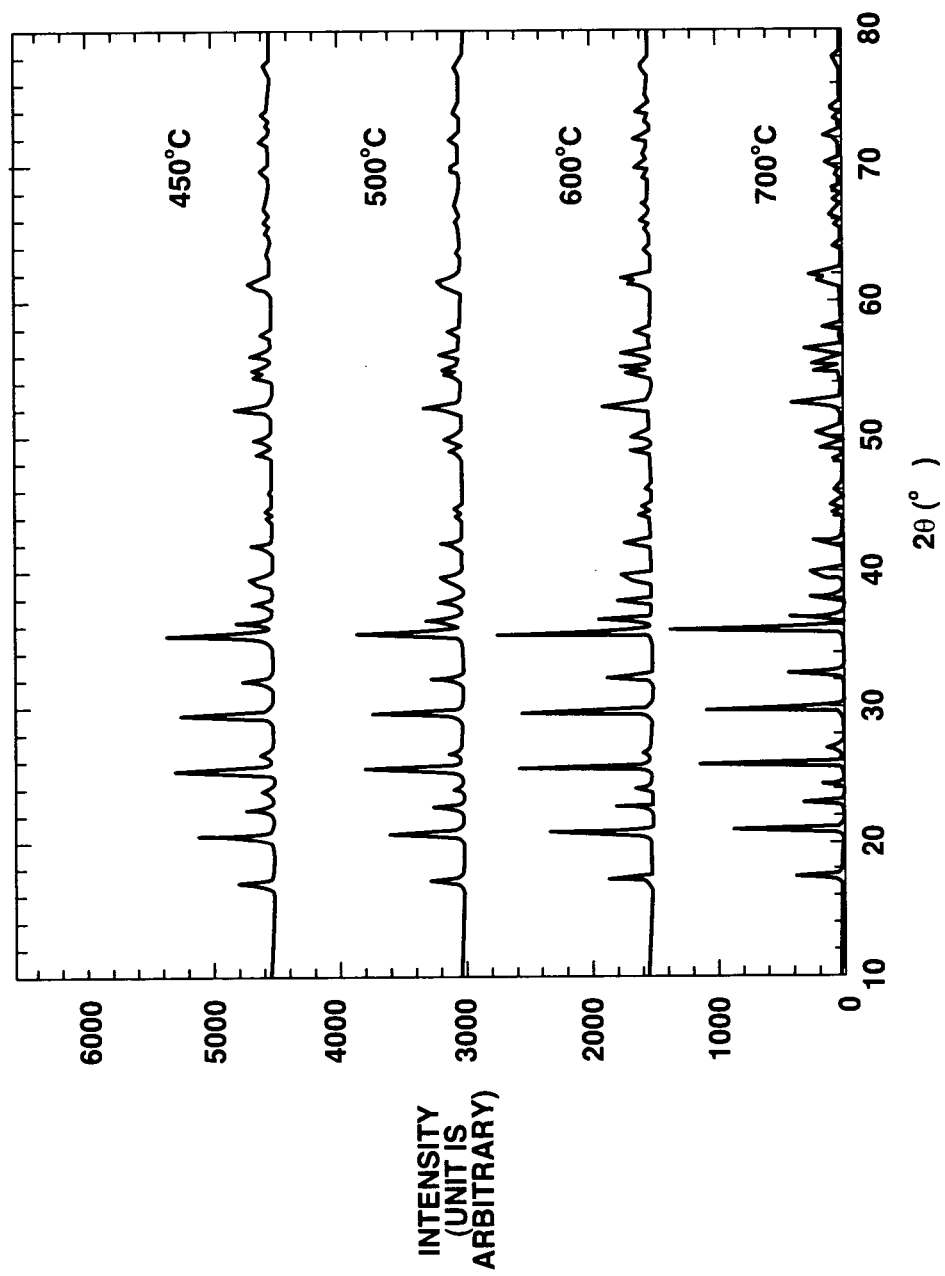
FIG. 16 is a graph showing an X-ray diffraction pattern of $Li(Mn_{0.6}Fe_{0.4})PO_4$.

Moreover, Li(Mn$_{0.6}$Fe$_{0.4}$)PO$_4$ was prepared by adding MnCO$_3$ into the starting materials and by sintering in a similar manner. The x-ray diffraction diagram of the produced Li(Mn$_{0.6}$Fe$_{0.4}$)PO$_4$ is shown in FIG. 16, from which it is seen that Li(Mn$_{0.6}$Fe$_{0.4}$)PO$_4$ is free of impurities and is of the single-phase olivinic structure.

Figure 17:
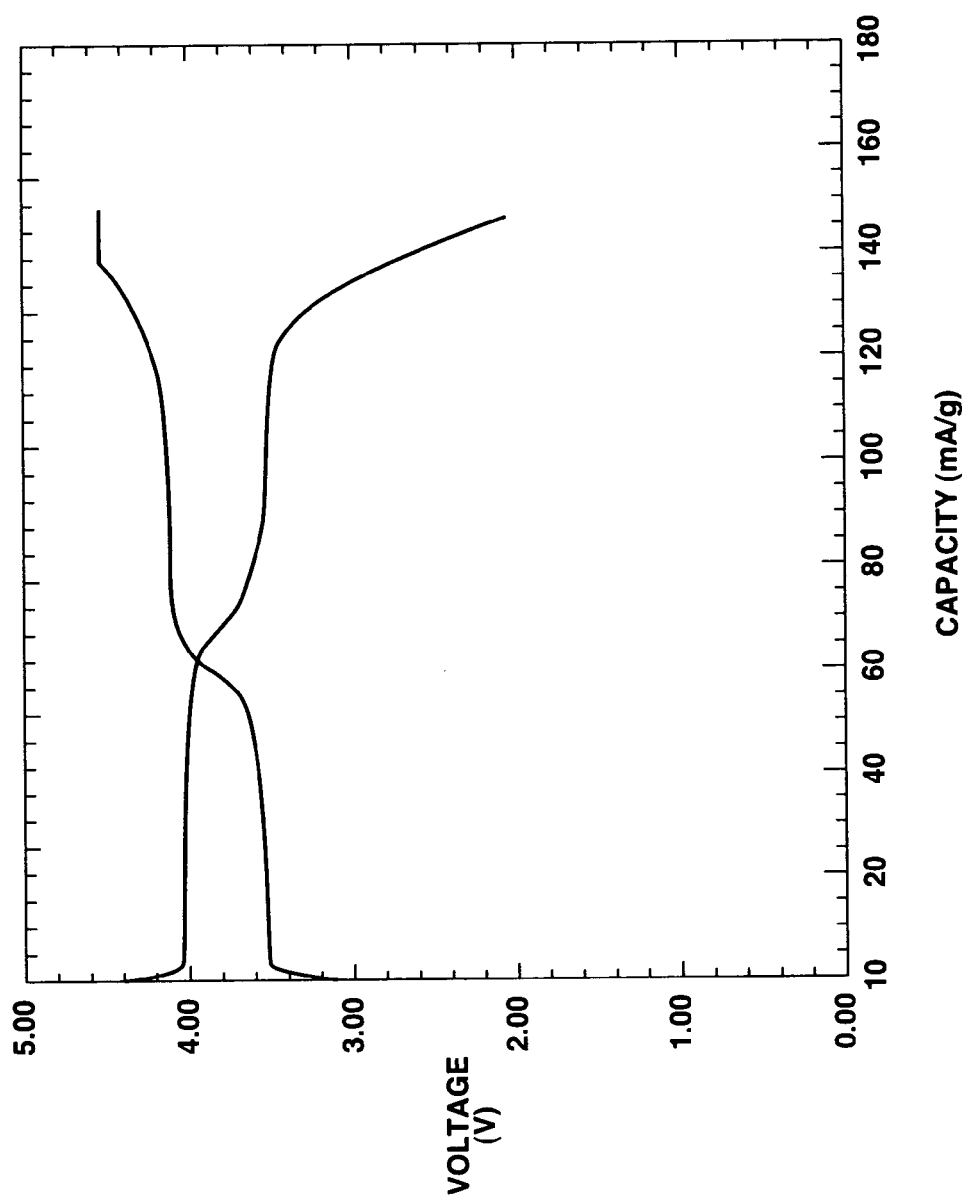
FIG. 17 shows charging/discharging characteristics of a battery prepared from $Li(Mn_{0.6}Fe_{0.4})PO_4$.
Figure 18:
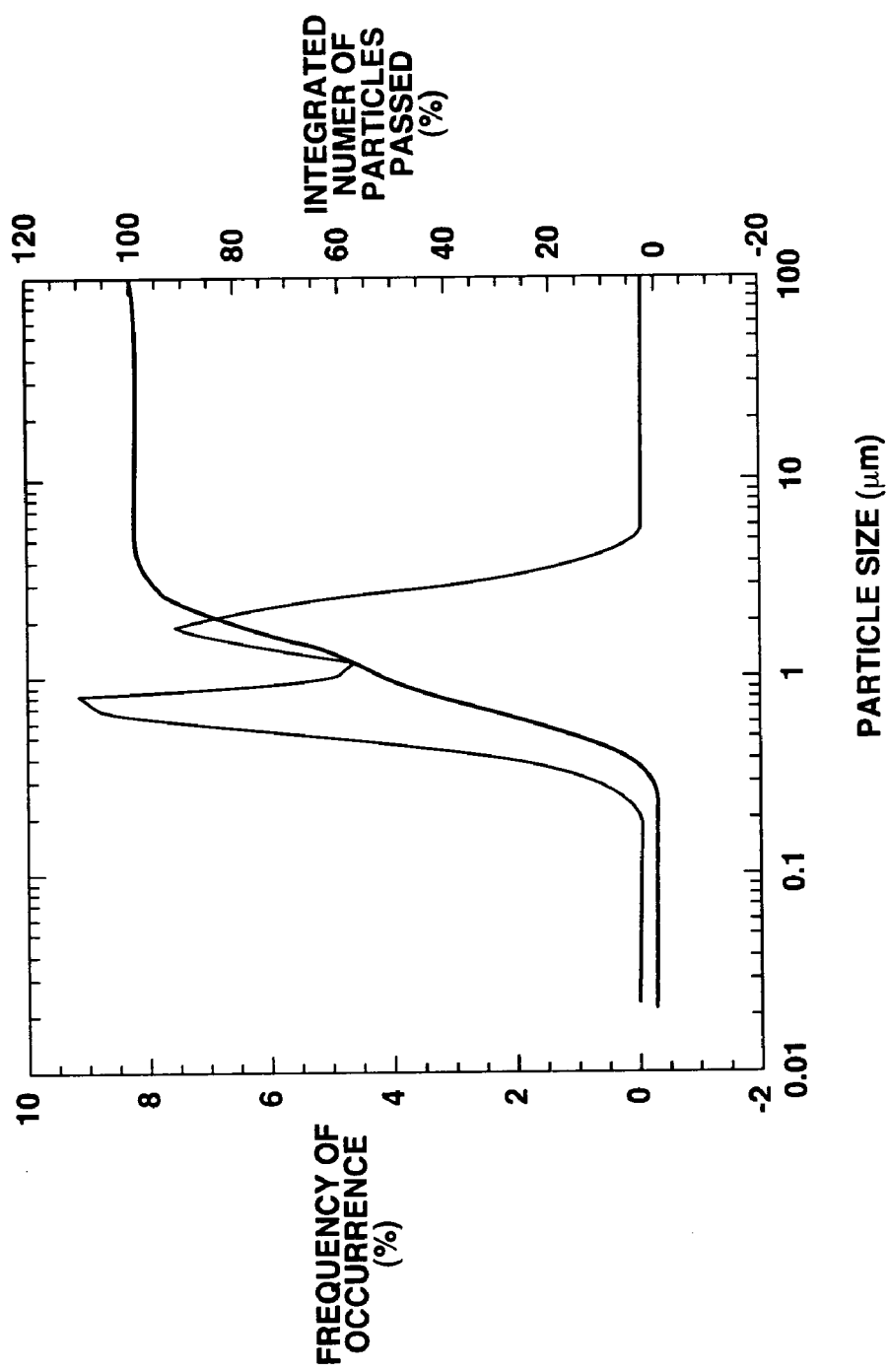
FIG. 18 shows grain size distribution of $Li(Mn_{0.6}Fe_{0.4})PO_4$ obtained on sintering at 600° C.

The charging/discharging characteristics of a battery prepared in a similar manner using Li(Mn$_{0.6}$Fe$_{0.4}$)PO$_4$ obtained on sintering at 600° C. are shown in FIG. 17, from which it is seen that not only the capacity as high as 150 mA/h/g is realized but also a capacity near 4V is newly observed, thereby improving the energy density.

The measured results of the grain size distribution of Li(M$_{0.6}$Fe$_{0.4}$)PO$_4$ obtained on sintering at 600° C. are shown in FIG. 17, from which it is seen that this Li(Mn$_{0.6}$Fe$_{0.4}$)PO$_4$ contains Li(Mn$_{0.6}$Fe$_{0.4}$)PO$_4$ with the grain size not larger than 10 μm, with the 10% cumulative volumetric grain size being within a range of not larger than 1 μm.

<Experiment 2>

In Experiment 2, measurement was made of the Moessbauer spectrum of LiFePO$_4$ of the sample 6, sample 2 and the sample 1, containing Fe responsible for the observed Moessbauer effect, and obtained at the sintering temperatures of 320° C., 400° C. and 600° C., respectively, amongst the positive electrode active materials prepared in Experiment 1, using the Moessbauer spectroscopic method.

In measuring the Moessbauer spectrum, 50 mg of LuFePO$_4$, as sample, was charged in plural holes in a lead plate 0.5 mm in thickness and 15 mm in diameter, and both sides of the holes were sealed with a tape, and $^{57}$Co of 1.85 Gbq was illuminated on the plate charged with the sample.

Figure 19:
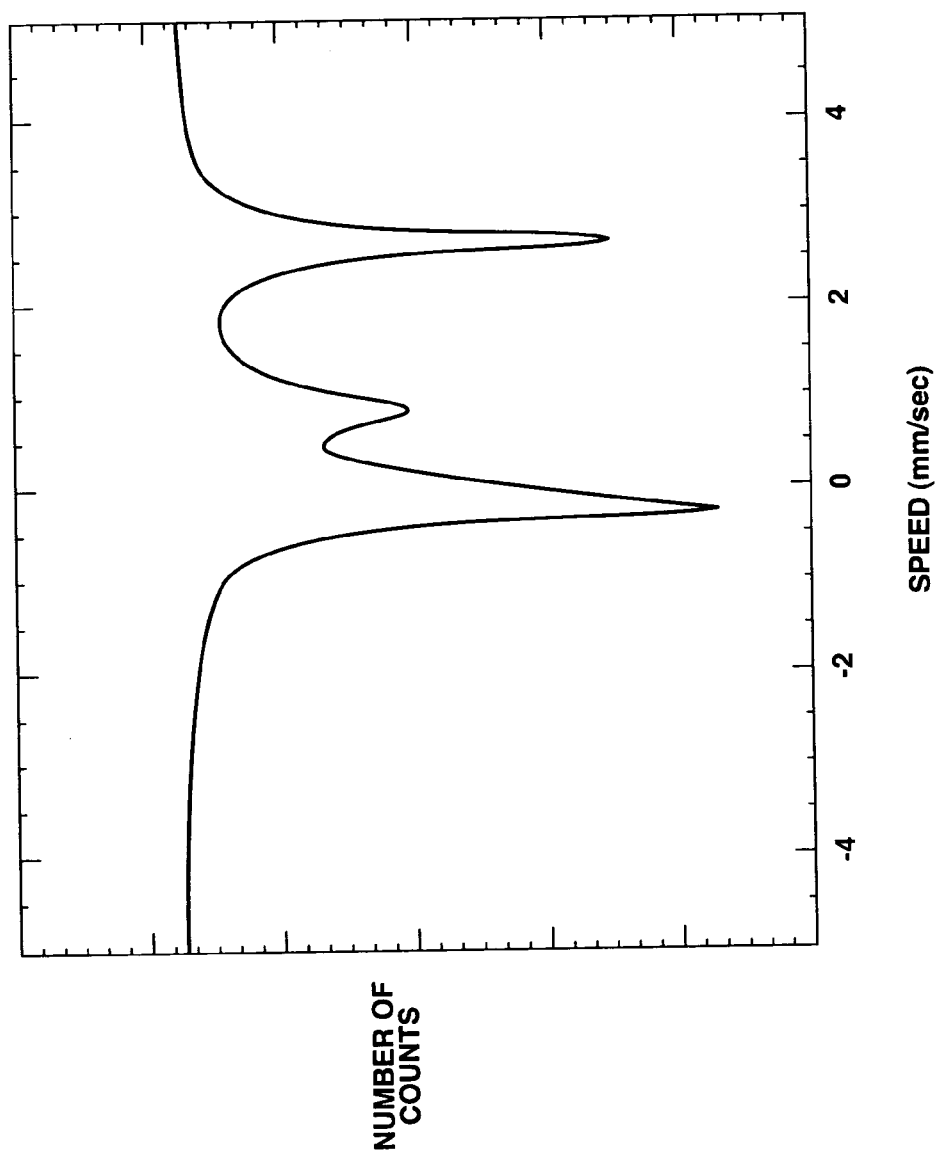
FIG. 19 is a Moessbauer spectrum diagram of $LiFePO_4$ of sample 6 synthesized at a sintering temperature of 320° C.
Figure 20:
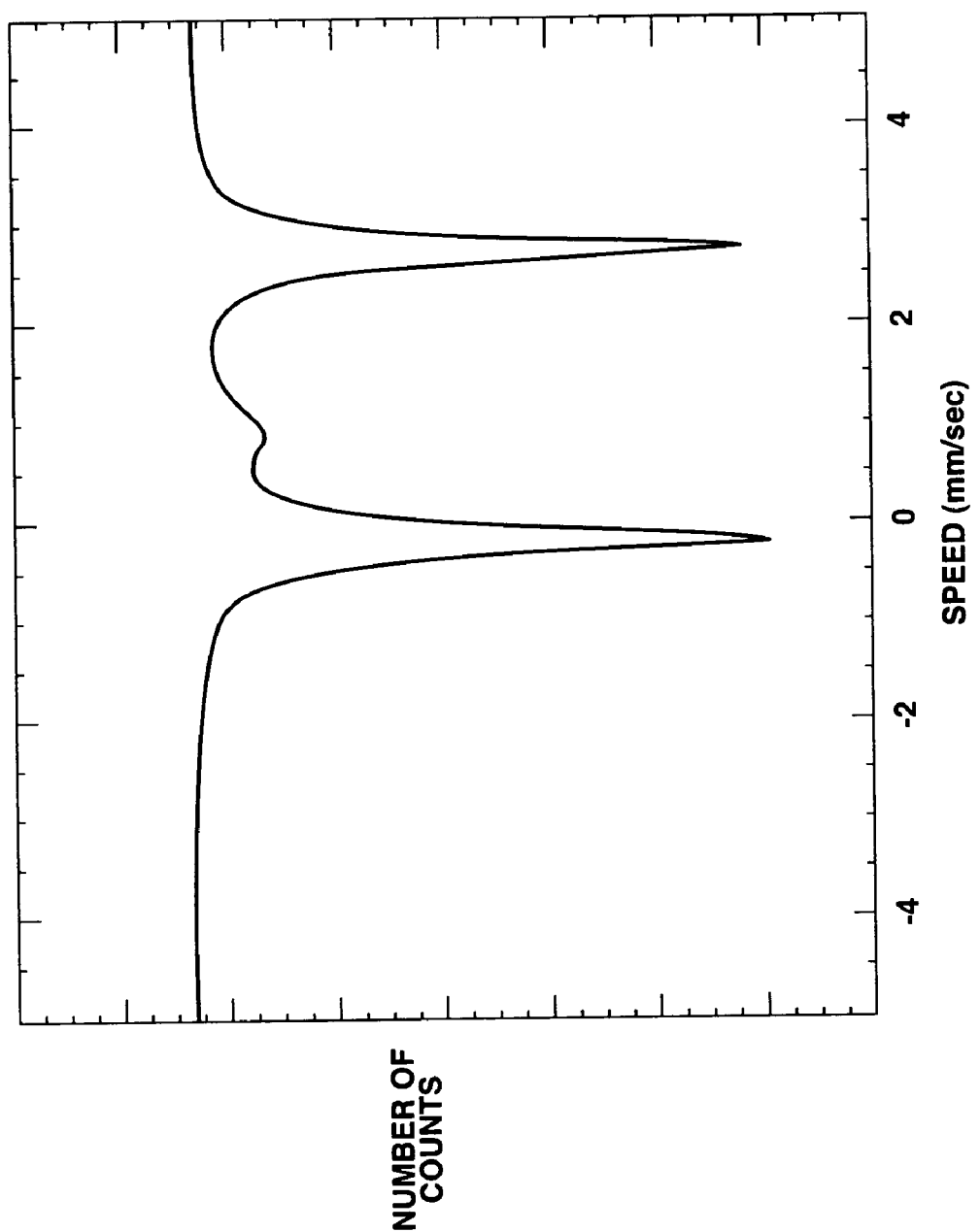
FIG. 20 is a Moessbauer spectrum diagram of $LiFePO_4$ of sample 2 synthesized at a sintering temperature of 400° C.
Figure 21:
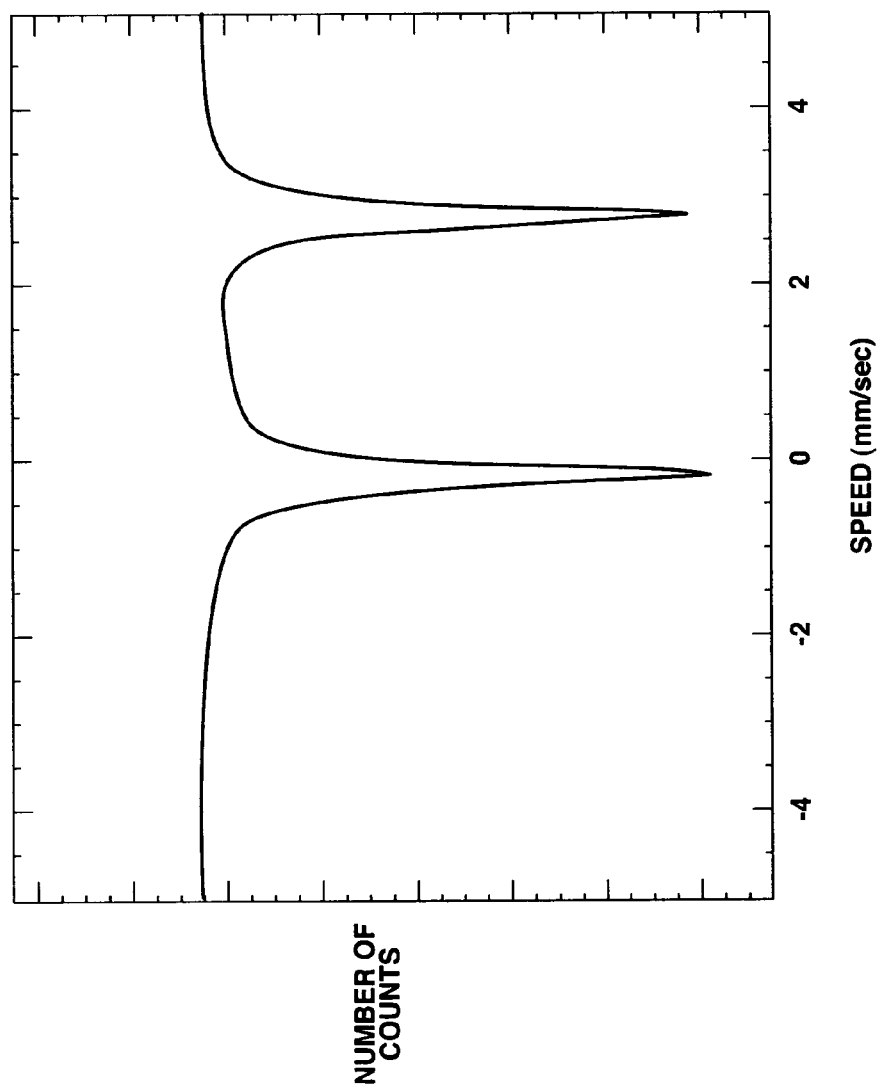
FIG. 21 is a Moessbauer spectrum diagram of $LiFePO_4$ of sample 6 synthesized at a sintering temperature of 600° C.

The measured results of the spectrum of LiFePO$_4$, as samples 6, 2 and 1, obtained by Moessbauer spectroscopic method, are shown in FIGS. 19, 20 and 21, respectively.

Figure 22:
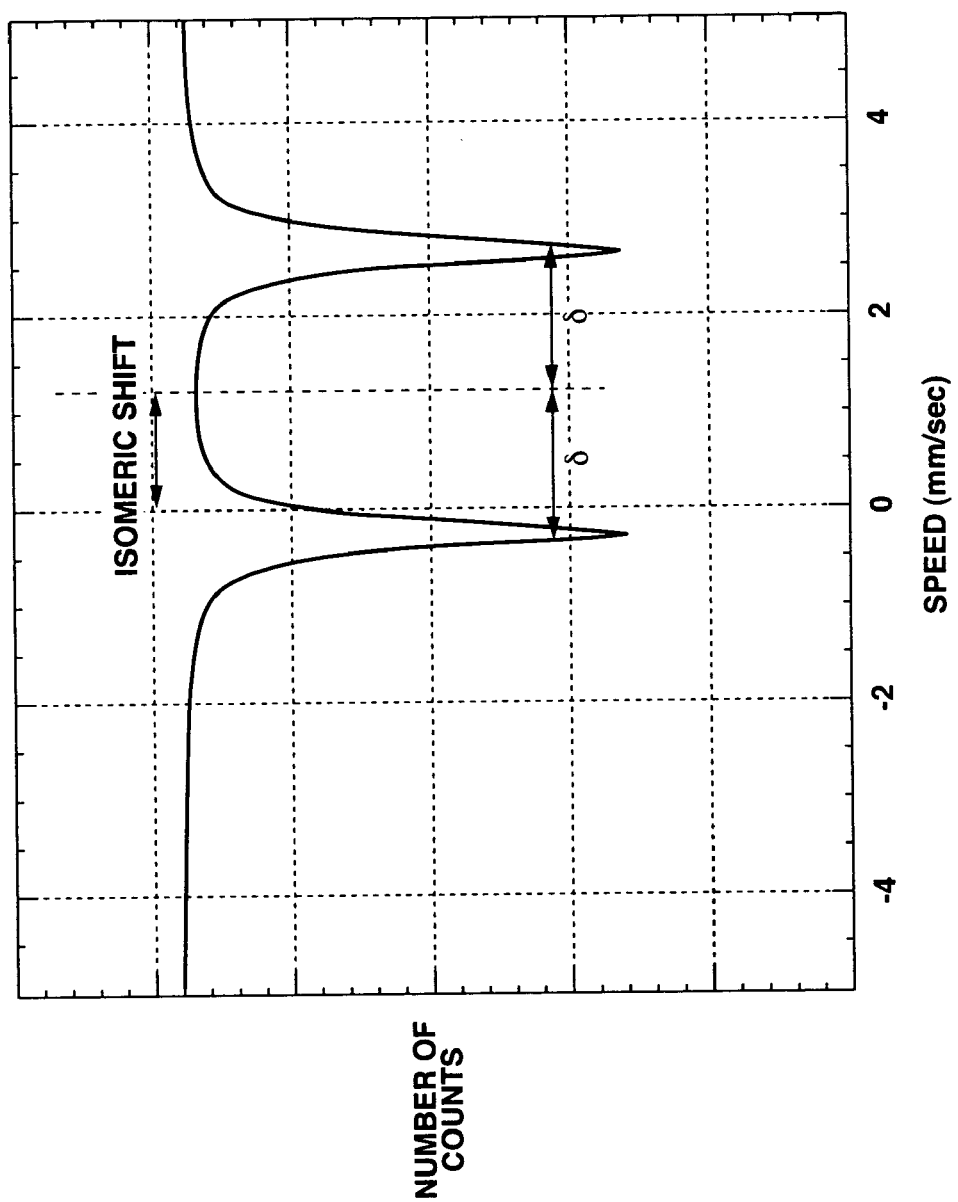
FIG. 22 is a Moessbauer spectrum diagram of $Fe^{2+}$ of $LiFePO_4$ of sample 6.
Figure 23:
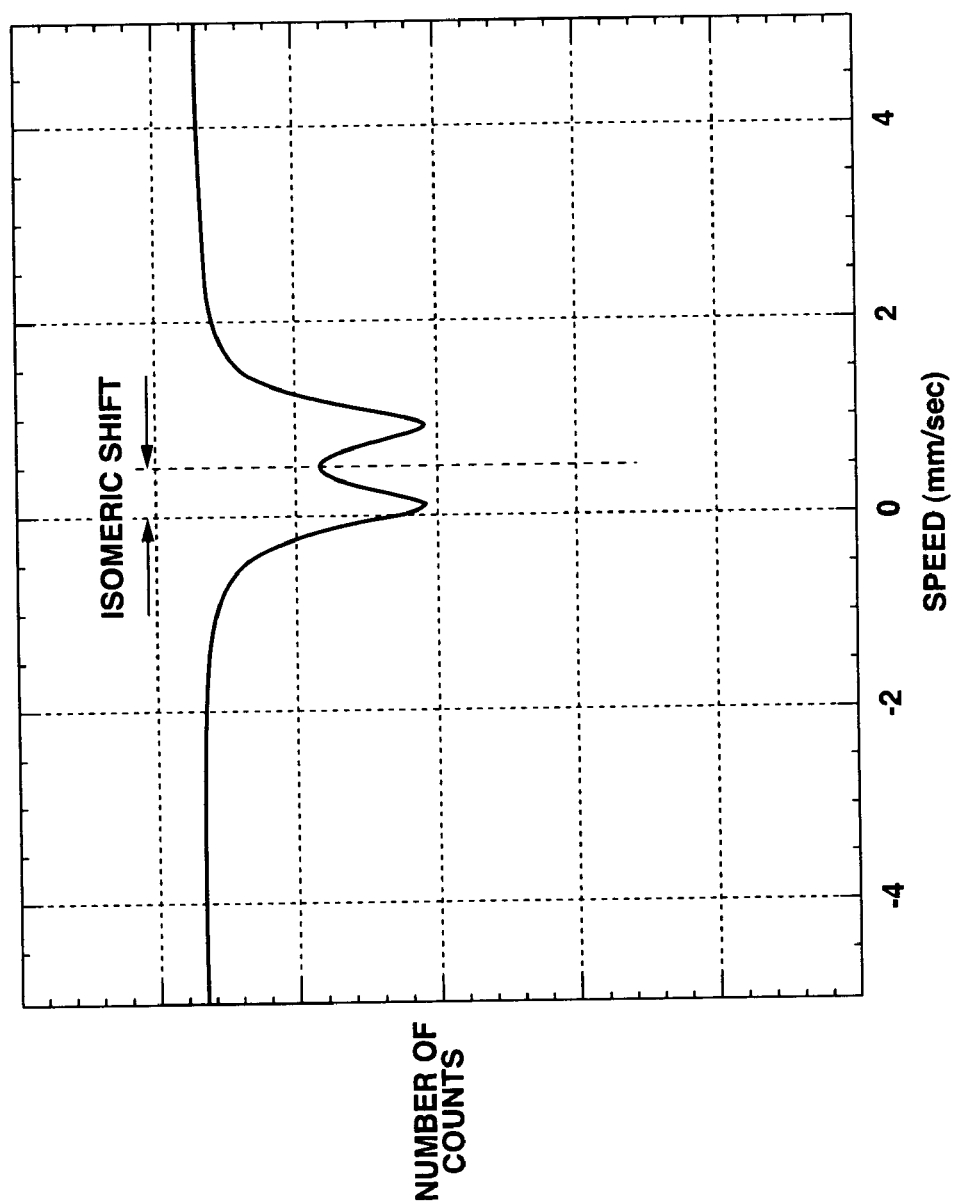
FIG. 23 is a Moessbauer spectrum diagram of $Fe^{3+}$ of $LiFePO_4$ of sample 6.

The spectra of Fe$^{2+}$ and Fe$^{3+}$, obtained on fitting the Moessbauer spectrum of LiFePO$_4$ of sample 6 shown in FIG. 19, are shown in FIGS. 22 and 23, respectively.

Figure 24:
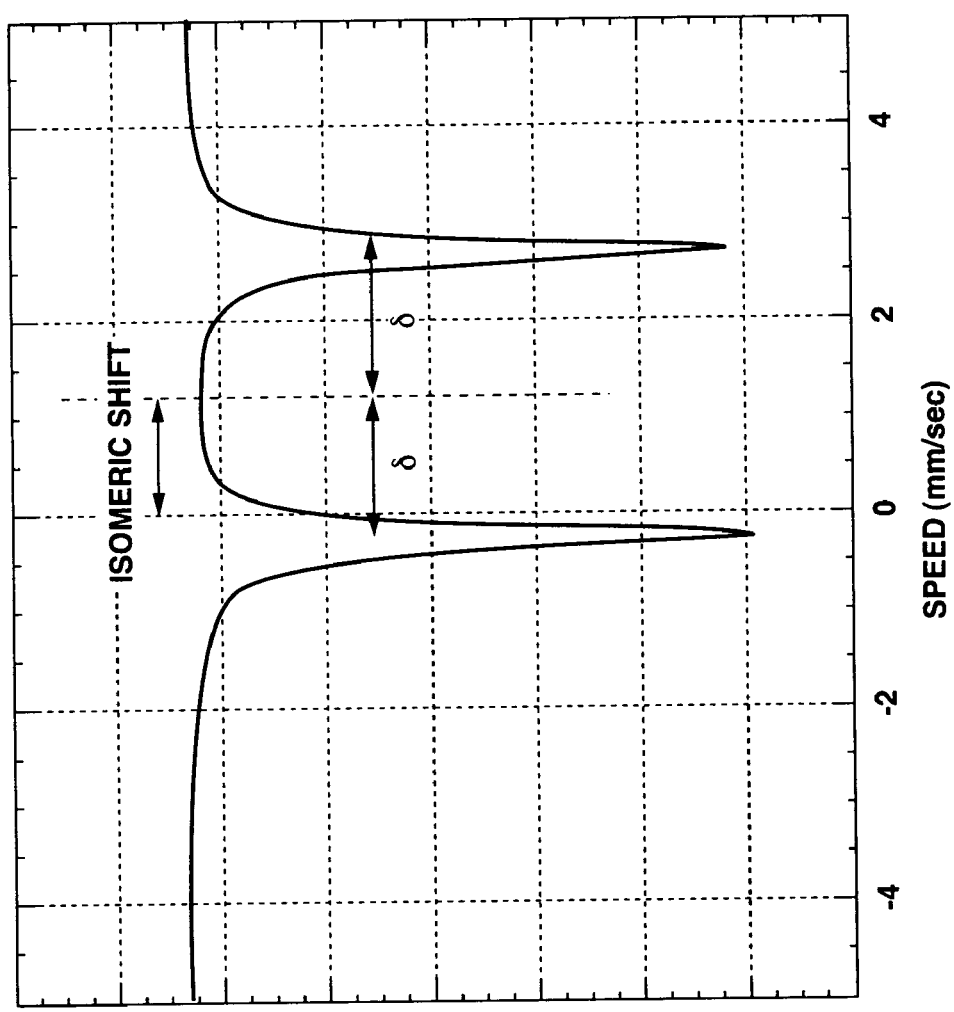
FIG. 24 is a Moessbauer spectrum diagram of $Fe^{2+}$ of $LiFePO_4$ of sample 2.
Figure 25:
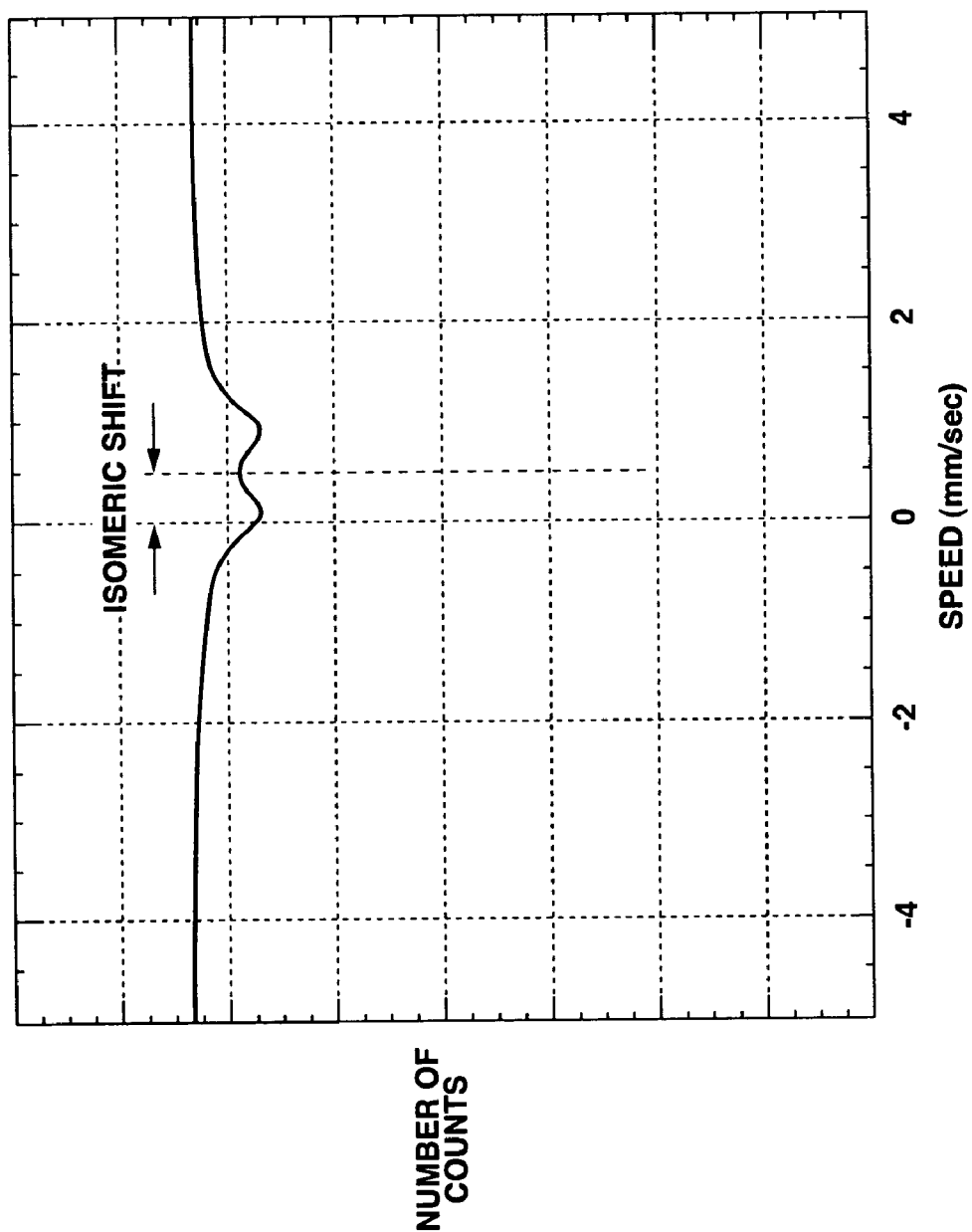
FIG. 25 is a Moessbauer spectrum diagram of $Fe^{3+}$ of $LiFePO_4$ of sample 2.

The spectra of Fe$^{2+}$ and Fe3T, obtained on fitting the Moessbauer spectrum of LiFePO$_4$ of sample 2 shown in FIG. 20, are shown in FIGS. 24 and 25, respectively.

Figure 26:
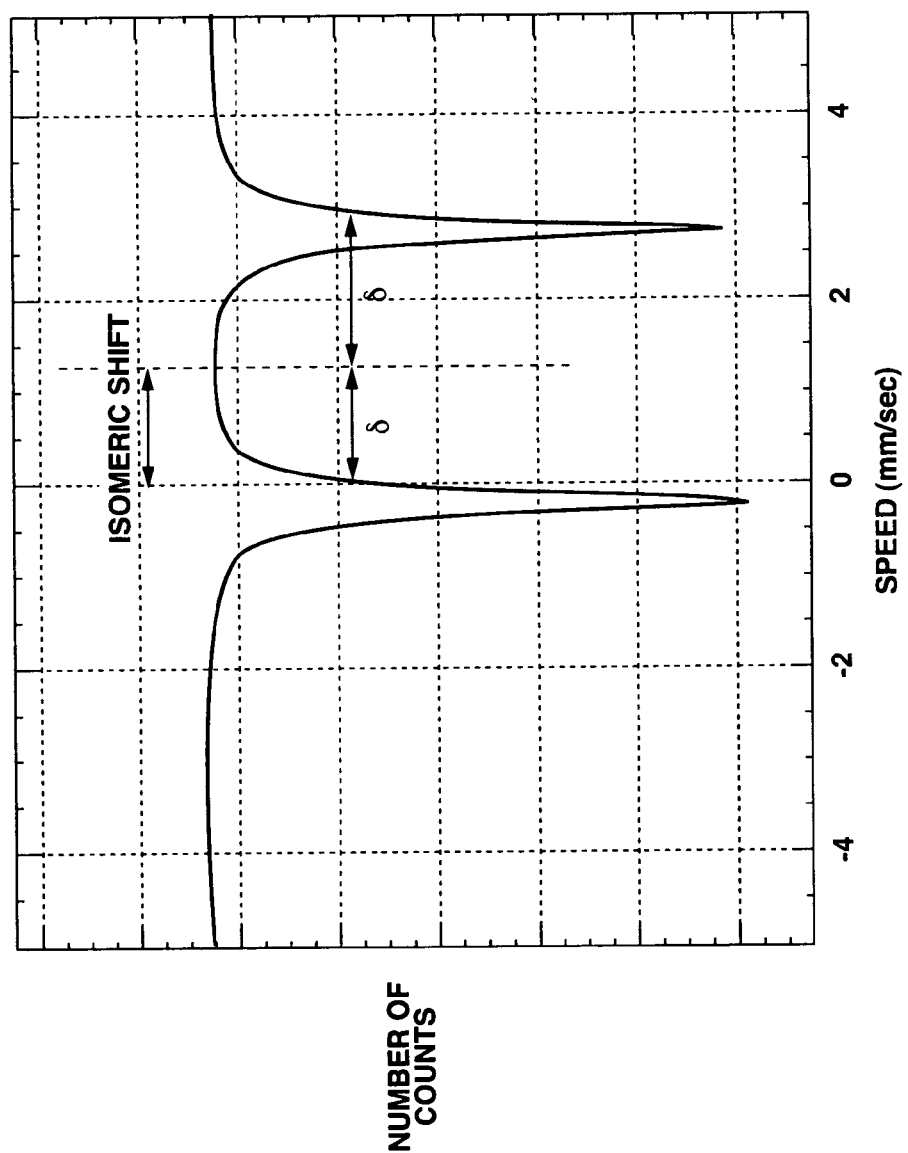
FIG. 26 is a Moessbauer spectrum diagram of $Fe^{2+}$ of $LiFePO_4$ of sample 1.
Figure 27:
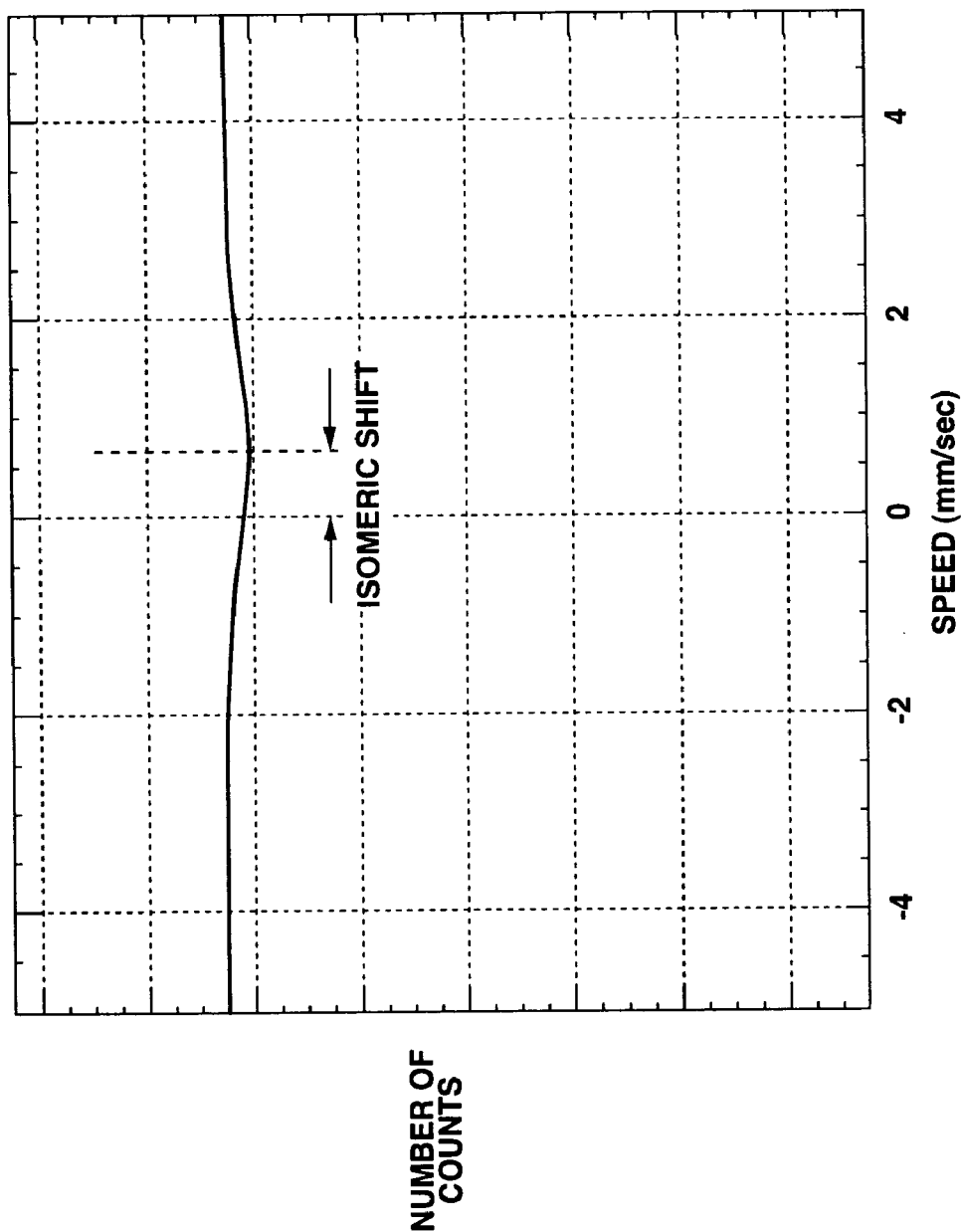
FIG. 27 is a Moessbauer spectrum diagram of $Fe_3^+$ of $LiFePO_4$ of sample 1.

The spectra of Fe$^{2+}$ and Fe3T, obtained on fitting the Moessbauer spectrum of LiFePO$_4$ of sample 2 shown in FIG. 21, are shown in FIGS. 26 and 27, respectively.

The spectrum inherent to LiFePO$_4$ is a doublet with an isomeric shift corresponding to Fe$^{2+}$ being approximately 1.2 mm/sec and quadrupolar fission being approximately 2.9 mm/sec, as shown in FIGS. 22, 24 and 26.

On the other hand, with LiFePO$_4$, as sample 6, with the sintering temperature of 320° C., a broad doublet with an isomeric shift corresponding to Fe$^{3+}$ of approximately 0.4 mm/sec and with a quadrupolar fission of approximately 0.8 mm/sec, as shown in FIG. 23.

The value of A/B, where A is the area strength of the doublet corresponding to Fe$^{3+}$, that is the area strength of the spectrum with the isomeric shift not less than 0.1 mm/sec and not larger than 0.7 mm/sec and B is the area strength of the doublet corresponding to Fe$^{2+}$, that is the area strength of the spectrum with the isomeric shift not less than 0.8 mm/sec and not larger than 1.5 mm/sec:

TABLE 1

| sintering temperature | | A/B |
|---|---|---|
| 320° C. | sample 6 | 0.77 |
| 400° C. | sample 2 | 0.34 |
| 600° C. | sample 1 | 0.15 |

In Experiment 1, if X-ray diffraction is carried out on samples 1, 2 and 6, no spectrum proper to a phase containing Fe$^{2+}$, for example, trivalent iron compounds, was observed, as shown in FIG. 2. However, if the Moessbauer spectroscopic measurement is performed on samples 1, 2 and 6, existence of the Fe$^{3+}$-containing phase was confirmed. This is due to the fact that X-ray diffraction occurs only as a result of long-distance interference of crystals, whereas the Moessbauer spectroscope directly detects the information in the vicinity of the atomic nuclei.

From Table 1, it is seen that the sample 6, with a sintering temperature as low as 320° C., contains a larger quantity of a phase containing $Fe^{3+}$ not having long-distance order.

From Table 1, it is seen that A/B depends on the sintering temperature of $LiFePO_4$, and that, the lower the sintering temperature, the more is the content of $Fe^{3+}$ in $LiFePO_4$.

If A/B shown in Table 1 is compared to FIG. 3 showing the relation between the sintering temperature of $LiFePO_4$ and the discharging capacity, it is seen that the smaller the value of A/B, that is the smaller the amount of the trivalent iron compound containing $Fe^{3+}$ in $LiFePO_4$, the higher is the capacity of the lithium ion secondary battery. It is also seen that if $LiFePO_4$ is synthesized at a sintering temperature not lower than 400° C., the value of A/B is less than 0.3, thus realizing a high capacity.

So, it may be seen that, if $LiFePO_4$ with A/B equal to 0.3 is used as a positive electrode active material, a lithium ion secondary battery of high capacity may be achieved.

INDUSTRIAL APPLICABILITY

As will be apparent from the foregoing description, the positive electrode active material according to the present invention contains a compound represented by the general formula $Li_xM_yPO_4$, where $0<x\leq 2$ and $0.8\leq y\leq 1.2$, with Md containing a 3d transition metal. Moreover, $Li_xM_yPO_4$ includes that with the BET specific surface area not less than 0.5 m²/g. This positive electrode active material, if used in a non-aqueous electrolyte secondary battery, realizes an extremely high capacity.

Moreover, the positive electrode active material according to the present invention contains a compound represented by the general formula $Li_x(Fe_yM_{1-y})PO_4$, where $0.9\leq x\leq 1.1$, $0<y\leq 1$, with M containing a 3d transition metal. With $Li_x(Fe_yM_{1-y})PO_4$, the ratio of A/B, where A and B denote area strengths of the spectrum obtained with the Moessbauer spectroscopic method, is less than 0.3. This positive electrode active material, if used in a non-aqueous electrolyte secondary battery, realizes an extremely high capacity.

On the other hand, the non-aqueous electrolyte secondary battery according to the present invention has a large capacity and an extremely high capacity by employing $LiFePO_4$, obtained by prescribing the sintering temperature and the particle shape, as a positive electrode active material.

On the other hand, the non-aqueous electrolyte secondary battery according to the present invention has a high capacity by employing $LiFePO_4$, with A/B less than 0.3, as a positive electrode active material.

Moreover, in the manufacturing method for the positive electrode active material according to the present invention, impurity-free single-phase $Li_xM_yPO_4$ is obtained, thus realizing a high capacity surpassing 120 mAh/g of a conventional non-aqueous electrolyte secondary battery.

The invention claimed is:

1. A method for producing a positive electrode active material comprising: a mixing step of mixing a starting materials for synthesis of a compound represented by the general formula $Li_xM_yPO_4$, where $0<x\leq 2$ and $0.8\leq y\leq 1.2$, with M containing a 3d transition metal; and a sintering step of sintering and reacting said precursor obtained in said mixing step; wherein, in said sintering step, said precursor is sintered at a temperature not lower than 400° C. and not higher than 700° C.

2. The method for producing a positive electrode active material according to claim 1 wherein, in said sintering step, said precursor is sintered at a temperature not lower than 400° C. and not higher than 600° C.

3. The method for producing a positive electrode active material according to claim 1 wherein said $Li_xM_yPO_4$ is $LiFePO_4$.

* * * * *